US011598345B2

(12) United States Patent
Stefankiewicz et al.

(10) Patent No.: US 11,598,345 B2
(45) Date of Patent: Mar. 7, 2023

(54) METHODS AND APPARATUS FOR CONTROLLING FAN DEVICES

(71) Applicant: Wangs Alliance Corporation, Port Washington, NY (US)

(72) Inventors: Eric Stefankiewicz, Old Bethpage, NY (US); Shelley Wald, Austin, TX (US); Kevin Darrah, Medina, OH (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 17/340,338

(22) Filed: Jun. 7, 2021

(65) Prior Publication Data

US 2021/0293249 A1    Sep. 23, 2021

Related U.S. Application Data

(63) Continuation of application No. 15/871,044, filed on Jan. 14, 2018, now Pat. No. 11,028,854.
(Continued)

(51) Int. Cl.
*F04D 27/00* (2006.01)
*G08C 17/02* (2006.01)
(Continued)

(52) U.S. Cl.
CPC ....... *F04D 27/004* (2013.01); *F04D 13/0693* (2013.01); *F04D 19/005* (2013.01);
(Continued)

(58) Field of Classification Search
CPC ... H04L 12/12; H04L 12/282; H04L 12/2823; H04L 12/2829; H04L 2012/2841;
(Continued)

(56) References Cited

U.S. PATENT DOCUMENTS 6,120,262 A * 9/2000 McDonough ........ H05B 47/195
417/424.1
6,967,565 B2   11/2005 Lingemann
(Continued)

FOREIGN PATENT DOCUMENTS

CN    204044547    12/2014
CN    204349625    5/2015
(Continued)

OTHER PUBLICATIONS

Notification of Transmittal of the International Search Report and the Written Opinion of the International Searching Authority, or the Declaration with the International Search Report and the Written Opinion from International Application No. PCT/US/2019013389, dated May 13, 2019, pp. 1-23.
(Continued)

*Primary Examiner* — Monica C King
(74) *Attorney, Agent, or Firm* — Weiss & Arons LLP

(57) ABSTRACT

Various embodiments are directed to use of RF and WiFi control in a fan device to control fan status and speed and/or fan light on/off status and intensity. A customer premises includes a WiFi router through which WiFi communications can be sent from a WiFi capable device, e.g., a cell phone, to control the fan device and its various functions. While WiFi control is via a WiFi router in the home, the control signals normally do not traverse the Internet or another external network. In addition to WiFi control, control of the fan device can be via an RF control device, e.g., a wall mounted controller. In some embodiments, the fan device reports its state and/or changes in state due to received commands to a server, and the server generates a recommended normal control schedule and an away control schedule and then uses the schedules to control fan device.

23 Claims, 16 Drawing Sheets

Related U.S. Application Data

(60) Provisional application No. 62/617,274, filed on Jan. 14, 2018, provisional application No. 62/617,152, filed on Jan. 12, 2018.

(51) Int. Cl.
| | |
|---|---|
| *F04D 25/08* | (2006.01) |
| *F04D 25/06* | (2006.01) |
| *G05B 15/02* | (2006.01) |
| *F04D 13/06* | (2006.01) |
| *F04D 19/00* | (2006.01) |

(52) U.S. Cl.
CPC .......... *F04D 25/06* (2013.01); *F04D 25/088* (2013.01); *F04D 27/001* (2013.01); *F04D 27/008* (2013.01); *G05B 15/02* (2013.01); *G08C 17/02* (2013.01); *G08C 2201/10* (2013.01)

(58) Field of Classification Search
CPC .......... H04L 2012/285; H04L 67/1044; H04L 67/125; H04L 12/2803; H04L 12/2816; H04L 12/2832; H04L 67/10; H04L 67/12; H04L 67/22; H04L 69/24; H05B 47/19; H05B 47/12; H05B 47/155; H05B 47/175; H05B 47/195; F04D 25/088; F04D 25/068; F04D 25/0693; F04D 27/004; F04D 29/005; F04D 29/388; G05B 15/02; G05B 19/0426; G05B 2219/2642; G05B 19/4185; G05B 2219/23297; G05B 2219/25022
See application file for complete search history.

(56) References Cited

U.S. PATENT DOCUMENTS

| | | |
|---|---|---|
| 9,465,377 B2 | 10/2016 | Davis et al. |
| 9,547,299 B2 | 1/2017 | Chen et al. |
| 9,589,461 B1 | 3/2017 | Byrne et al. |
| 9,590,427 B2 | 3/2017 | Davis et al. |
| 10,429,869 B2 | 10/2019 | Davis et al. |
| 10,454,703 B2 | 10/2019 | Shinar |
| 10,511,206 B2 | 12/2019 | Zhang |
| 10,862,313 B2 | 12/2020 | Davis et al. |
| 10,954,948 B1 | 3/2021 | Lowe et al. |
| 10,975,874 B2 | 4/2021 | Monteith et al. |
| 2007/0110192 A1 | 5/2007 | Steiner |
| 2007/0159153 A1 | 7/2007 | Fricke et al. |
| 2008/0221715 A1* | 9/2008 | Krzyzanowski ...... H04L 12/282 |
| | | 700/90 |
| 2013/0030589 A1* | 1/2013 | Pessina .................. G05B 15/02 |
| | | 700/295 |
| 2013/0073431 A1 | 3/2013 | Suro et al. |
| 2014/0101082 A1 | 4/2014 | Matsuoka et al. |
| 2014/0113542 A1 | 4/2014 | Foreman et al. |
| 2014/0163751 A1* | 6/2014 | Davis ..................... H04L 12/12 |
| | | 700/286 |
| 2014/0177900 A1 | 6/2014 | Berkman et al. |
| 2014/0270714 A1 | 9/2014 | Osminer et al. |
| 2015/0086363 A1* | 3/2015 | Graziano ................ F21V 29/83 |
| | | 416/5 |
| 2015/0325112 A1 | 11/2015 | McPherson et al. |
| 2015/0351203 A1 | 12/2015 | Shen et al. |
| 2016/0047391 A1* | 2/2016 | McPherson .......... F04D 25/088 |
| | | 417/423.7 |
| 2016/0216700 A1 | 7/2016 | Fan et al. |
| 2016/0259305 A1* | 9/2016 | Chen ...................... H04R 3/005 |
| 2016/0259308 A1* | 9/2016 | Fadell ..................... H04W 4/80 |
| 2017/0104426 A1 | 4/2017 | Mills |
| 2017/0318701 A1 | 11/2017 | Steiner |
| 2019/0186496 A1* | 6/2019 | Monteith ............... F04D 25/088 |
| 2019/0219059 A1 | 7/2019 | Stefankiewicz et al. |
| 2019/0219060 A1 | 7/2019 | Stefankiewicz et al. |
| 2019/0220071 A1 | 7/2019 | Stefankiewicz et al. |

FOREIGN PATENT DOCUMENTS

| | | |
|---|---|---|
| CN | 204928499 | 12/2015 |
| CN | 205046374 | 2/2016 |
| CN | 102984039 | 3/2016 |
| CN | 105867206 | 8/2016 |
| CN | 210183136 | 3/2020 |
| CN | 111770662 | 10/2020 |
| CN | 111902850 | 11/2020 |
| EP | 2914858 | 1/2020 |
| JP | 2007232323 | 9/2007 |
| KR | 10-2018-0108225 | 10/2018 |
| KR | 101962823 | 7/2019 |
| TW | 201621225 | 6/2016 |
| WO | WO2017/151682 | 9/2017 |

OTHER PUBLICATIONS

Search Report in Chinese Application No. 201980012708.X, dated Jun. 23, 2021.
Office Action in Chinese Application No. 201980012708.X, dated Jun. 23, 2021.
Office Action in Chinese Application No. 201980012708.X, dated Dec. 16, 2021.
Office Action in Chinese Application No. 201980012708.X, dated Jun. 23, 2022.

* cited by examiner

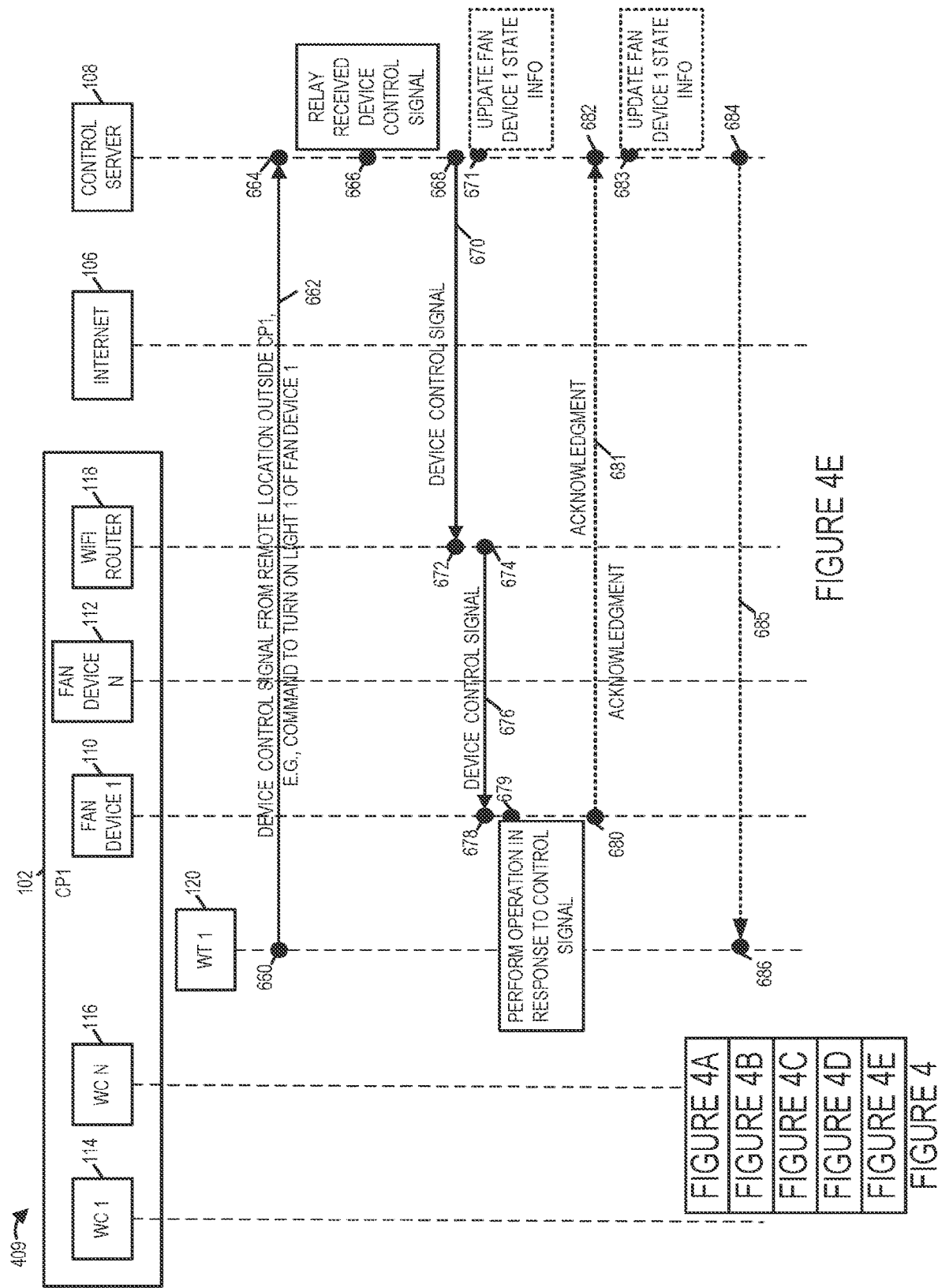

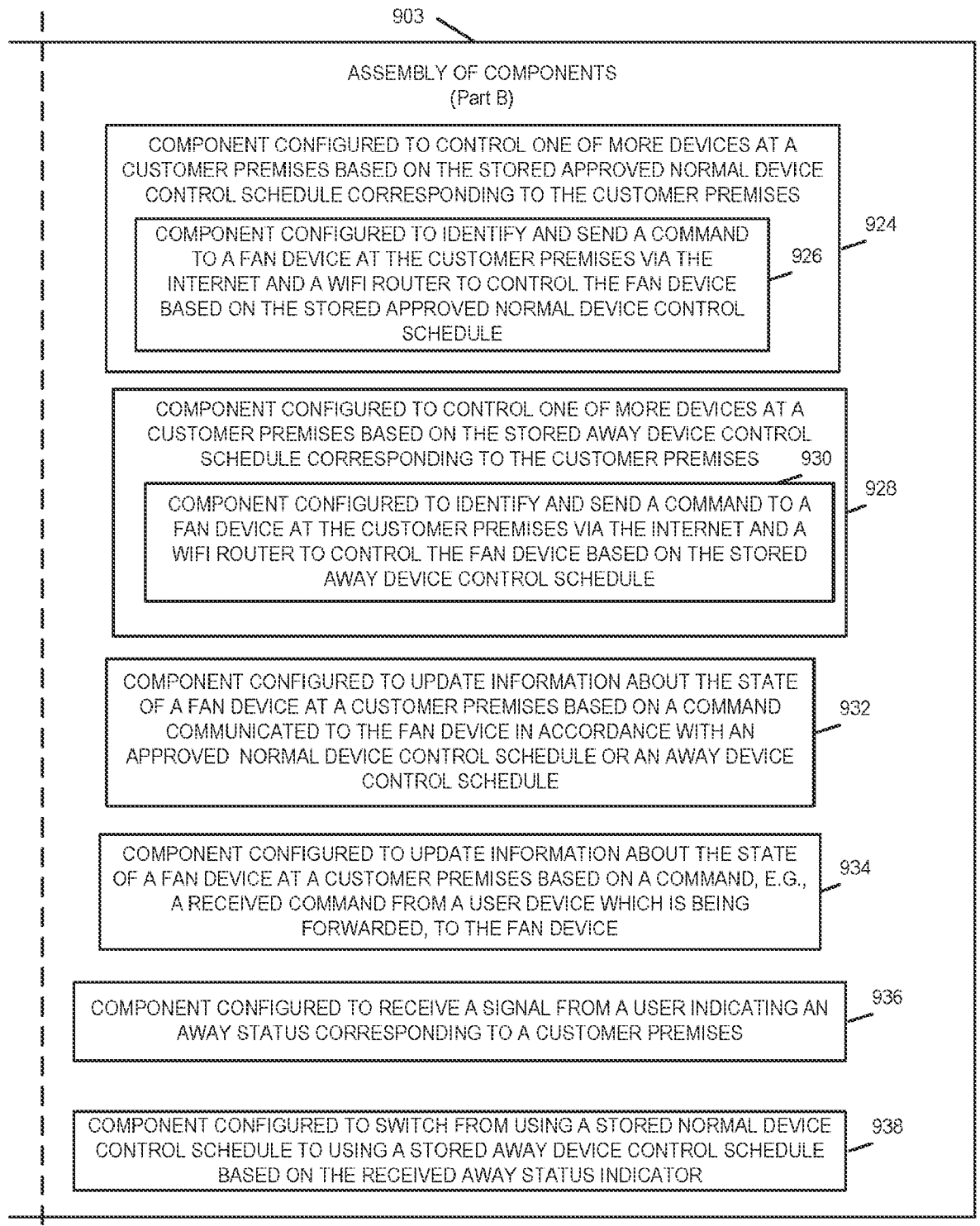

METHODS AND APPARATUS FOR CONTROLLING FAN DEVICES

RELATED APPLICATIONS

The present application is a continuation of U.S. application Ser. No. 15/871,044, filed Jan. 14, 2018, which claims the benefit of the filing date of U.S. Provisional Application Ser. No. 62/617,152 filed on Jan. 12, 2018 and Ser. No. 62/617,274 filed on Jan. 14, 2018 each of which is hereby expressly incorporated by reference in its entirety.

FIELD

The present invention relates to fan devices, and more particularly, to methods and apparatus for controlling devices using different interfaces, e.g., an RP interface and a WiFi interface.

BACKGROUND

Ceiling fans are often mounted in rooms to improve air circulation and/or provide cooling. In some cases lights are mounted on the fan. While the ability to separately control a fan motor and light are desirable, such control if implemented using standard wired switches requires separate switches for the light and the fan motor.

In many cases, fans are mounted where a ceiling light was previously located and thus while power, e g., 120V, may be available at the location where the fan is being mounted connections to multiple switches may not be available. In such cases, the combined ceiling fan and light fixture may receive power via a single wall switch with the power being provided to both the light and fan motor at the same time. In order to allow separate control of the light and fan motor switches pull cords may be included in the fan assembly with one switch being used to control the light fixture and another being used to control the fan motor.

While the use of pull cord controls of a fan and light are common, they are not only unsightly but can pose potential safety issues. Dangling cords can accidently get caught on objects, people and/or even get entangled in the moving fan blades. With advancements in LED lighting it is often desirable to support variable lighting levels rather than a simple on/off light control. Similarly the ability to control the speed of a ceiling fan motor rather than simply turn the motor on and off can be desirable.

In the interest of energy efficiency it can be desirable to support fan and/or light control according to a schedule which takes into consideration calendared events, work schedules and/or other conditions so that a fan and/or light is not run needlessly when no one is around. To the extent that a schedule could be supported, it would be desirable if the schedule could be entered and implemented without the need for a wired wall controller to provide control signals via a wire to the fan and/or light unit since wires can be difficult and/or costly to run.

In view of the above it should be appreciated that there is a need for improved methods of controlling a fan and/or ceiling light. It would be desirable if at least some of the improved methods and/or apparatus could avoid the need for multiple wall switches wired separately to a fan and a light. While not necessary for all embodiments it would be desirable if fan and/or light control could support a wide range of functions such as fan speed, fan direction, and/or light intensity in addition to simple light and/or fan on/off operations.

SUMMARY

Various embodiments are directed to use of an RF and WiFi control in the fan device to control fan status and speed and/or fan light on/off status and intensity. The fan device includes both an RF interface and a WiFi interface. The customer premises includes a WiFi router through which WiFi communications can be sent from a WiFi capable device, e.g., a cell phone, to control the fan device and its various functions. While WiFi control is via a WiFi router in the home, the control signals normally do not traverse the Internet or another external network. Accordingly, WiFi control is possible without the need for a connection to an external network or server. In addition to WiFi control, control of the fan device can be via an RF control device, e.g., a wall mounted controller. In some embodiments 120V power is supplied to the fan device via the wall mounted controller. While 120V power may be supplied via the wall controller, control signals from the wall mounted controller are transmitted using RF signals to the RF interface of the fan device. The RF interface uses a different frequency band than the frequency band used for WiFi signals sent to/from the WiFi router. In some embodiments the RF interface uses an unlicensed frequency spectrum which is different than that used for WiFi signals.

Since the RF and WiFi control signals need not pass over an external communications network as in the case of systems where commands must first be sent to a network server outside a customer premises and then sent from the network server to the device to be controlled, the fan device can be controlled either by the wall controller or a WiFi device even if a connection to the Internet or another external network is not available.

In some, but not necessarily all embodiments, the fan device reports its state and/or changes in state due to received commands to a server, e.g., located outside the customer premises. The communication with the external server may be, and sometimes is, via a WiFi router and Internet connection. The server logs the state information of one or more devices at each customer premises it is associated with. The server generates, e.g., automatically, a recommended normal schedule based on historical device state information including device on/off times, fan speed information and/or light intensity information. Machine learning and historical device state information may be, and sometimes is, used for generating the recommended schedule for a customer premises. The recommended normal control schedule is communicated to an individual, e.g., a customer at the customer premises to which the schedule relates. The communication of the proposed schedule may be, and sometimes is, from the server via the Internet and WiFi router at the customer premises to which the schedule relates. The customer can approve the recommended schedule and/or provide a revised normal schedule to be used by the server to control devices at the customer premises.

In addition to generating a normal control schedule for a customer premises, an away schedule to be used when a customer indicates that the customer premises is in an away state is generated. An away state corresponds to when the normal occupants of the customer premises are away from the customer premises. The away schedule is generated based on a random function so that devices will be turned on at somewhat randomized times making it difficult for a potential burglar to determine whether the devices are being controlled by an automated system or by a human present at the premises. In some embodiments historical device use information is taken into consideration when the server automatically generates the away schedule with the on/off times being somewhat random but remaining within a reasonable time, e.g., 30 minutes or an hour, of when the devices are turned on and off when a human is present.

While a user can control the devices while in the home via the RF controller or a WiFi controller without having to send commands outside the home, remote control of devices is also supported. A user can login to the control server and once authenticated is allowed to send control commands to devices at the home via the control server and the WiFi router. In this way a user can control devices while away from the home. In the case of commands sent via the server, the server can, and sometimes does, update device state information based on the commands sent from the server to the device to be controlled thereby eliminating the need for the device to report a state change to the server. While in some embodiments devices do not report state changes to the server which are in response to commands communicated by the server to the device being controlled, in other embodiments the devices being controlled, e.g., fan devices, routinely report a state change to the control server regardless of whether the command was from the server, wall controller or WiFi device in the home.

The customer to which a home corresponds can enable/disable use of a control schedule by the server. For example the user can send a signal to the control server to indicate that the normal control schedule should be used or the away schedule should be used or that no control schedule should be used. The signal may indicate automated control is to be set to off for the home, automated control should be on and, when the automated control is on whether an away state is indicated indicating that the away schedule should be used or that the premises is in a normal state and thus the normal schedule should be used.

An exemplary control method, in accordance with some embodiments, comprises: receiving, at a fan device including a radio frequency signal receiver and a WiFi interface, a first radio frequency (RF) control signal from a control unit, said fan device and said control unit being located at a customer premises; implementing, at the fan device, an operation in response to a first command communicated by the first RF control signal; and operating the fan device to communicate to a server located outside the customer premises, via the WiFi interface, information indicating the operation implemented in response to the first command.

In various embodiments a controller with an RF interface is used to control a fan device which includes a fan motor and may also include a lighting device. The controller in some embodiments is in the form of a wall control module which may be, and sometimes is, mounted in a standard electrical wall box in a room in which the fan device to be controlled is located. To simplify installation and avoid the need for more than the normal 120V power line used to power an outlet, from a 120V AC prospective the controller acts as a simple pass through device through which AC power is supplied to the fan device unit. As a safety, the controller includes an AC disconnect which can be used to cut all power to the fan unit. The disconnect switch may be in the form of a push or pull switch or a pull tab which can interrupt the power to the fan device.

Control of the fan device is via an RF interface included in the wall controller. In some embodiments activation of the safety disconnect switch will cut power to the RF interface of the wall controller in addition to power to the fan device in this way, in some but not necessarily all embodiments, the safety cut off serves as a physical kill switch integrated into the wall controller for both the wall controller and the fan device.

The wall controller includes inputs for controlling fan on/off operations, light on/off operation, fan speed, e.g., up/down, and/or light intensity, e.g, fan device light output up/down. In some embodiments light output and fan speed can be smoothly controlled, e.g., with light intensity being controlled in a smooth fashion over a wide range of intensity values as opposed to simply a few discrete output levels. The wall controller transmits RF control signals to implement or communicate commands that are generated based on the pressing or altering of the control inputs on the wall controller. The control signals are transmitted to the fan device using a RF frequency band which is different from that used for WiFi signals at the customer premise where the controller is located.

An exemplary fan device controller, in accordance with some embodiments, includes: an AC voltage input; an AC output for supplying power to a fan device; an RF signal interface including an RF signal transmitter for transmitting commands to a device to be controlled; an RF controller for controlling the RF signal interface to send control signals including one or more commands to said fan device; and a disconnect switch for disconnecting said AC output from said AC input when said disconnect switch is switched to a disconnect state from a connect state.

BRIEF DESCRIPTION OF THE FIGURES

FIG. 4E is a fifth part of a drawing illustrating an exemplary fan device system, exemplary signaling, and exemplary operations in accordance with an exemplary control method.

FIG. 4, comprises the combination of FIG. 4A, FIG. 4B, FIG. 4D, and FIG. 4E.

FIG. 7B is a second part of an exemplary assembly of components, which may be included in an exemplary control server in accordance with an exemplary embodiment.

FIG. 7 comprises the combination of FIG. 7A and FIG. 7B.

DETAILED DESCRIPTION

Figure 1:
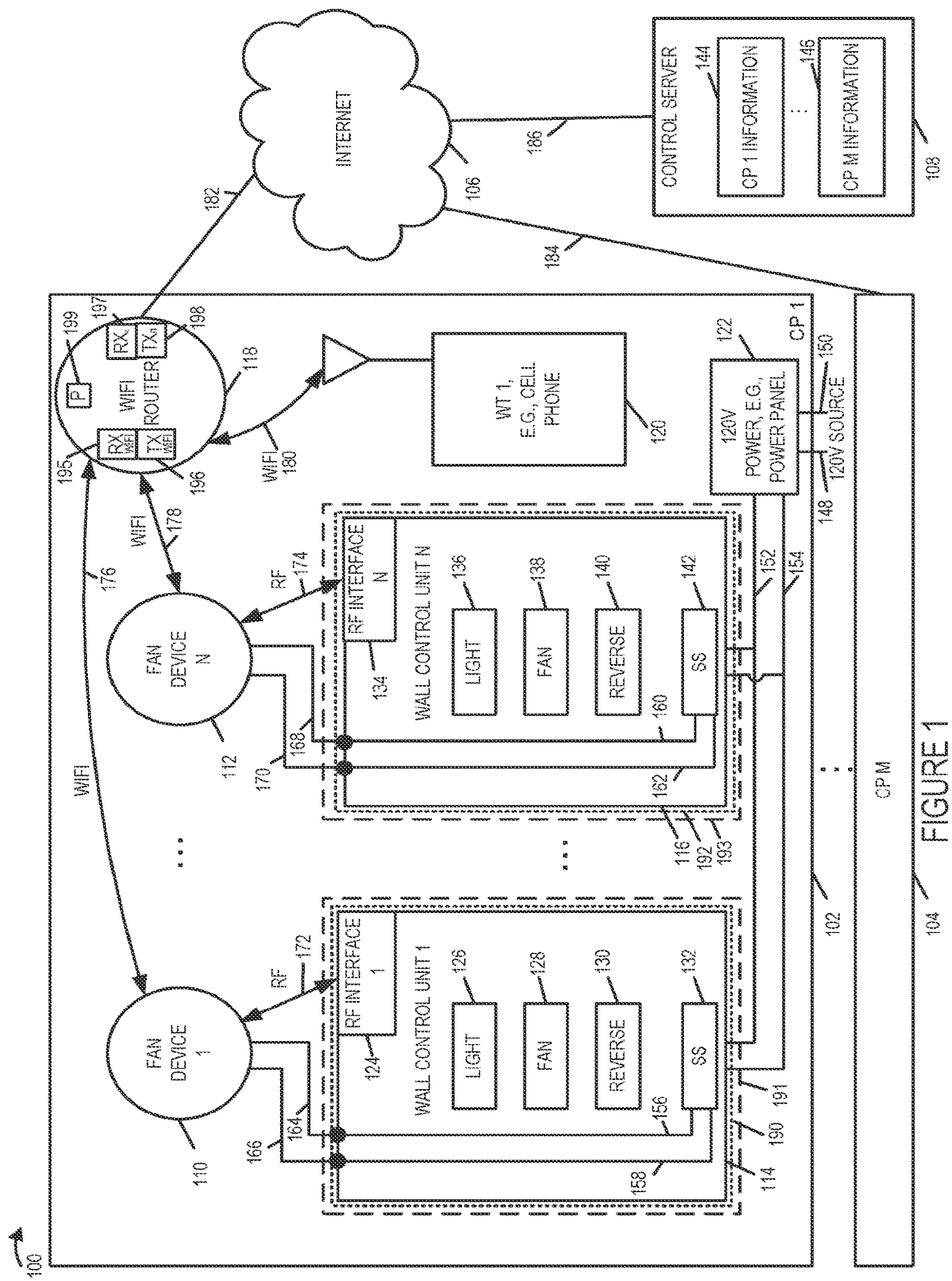
FIG. 1 is a drawing of an exemplary system including controllable fan devices, wall control units, a wireless terminal, a WiFi router and a control server in accordance with an exemplary embodiment.

FIG. 1 is a drawing of an exemplary fan device system 100 in accordance with an exemplary embodiment. Exemplary system 100 includes a plurality of customer premises sites (customer premises 1 (CP 1) 102, . . . , customer premises M (CP M) 104), Internet 106, and a control server 108 coupled together as shown in FIG. 1. CP 1 102 includes a plurality of fan devices, (fan device 1 110, . . . , fan device N 112), a plurality of wall control units, e.g., fan device controllers, (wall control unit 1 114, . . . , wall control unit N 116), a WiFi router 118, a wireless terminal (WT 1) 120, e.g., a cell phone, an a 120 V power source 122, e.g., a power panel. In one embodiment 120V power panel 122 includes a 20 A circuit breaker. Each wall control unit (114, 116) is configured to fit in an electrical box in a wall of a customer premises.

Wall control unit 1 114 includes RF interface 1 124, light on/off switch 126, fan on/off switch 128, fan reverse switch 130, and safety switch (SS) 132. Wall control unit 1 114 is installed in electrical box 190 of wall 191. In some embodiments, fan device 1 110 and wall control unit 114 are both located in a first room in customer premises 1 102. Wall control unit N 116 includes RF interface 2 134, light on/off switch 136, fan on/off switch 138, fan reverse switch 140, and safety switch (SS) 142. Wall control unit N 116 is installed in electrical box 192 of wall 193. In some embodiments, fan device N 112 and wall control unit N 116 are both located in a second room in customer premises 1 102, the second room being a different room than the first room. Fan device state information includes fan state information for fan motors and light state information for fan lights.

Control server 108 includes customer premises information corresponding to a plurality of customer premises (CP 1 information 144, . . . , CP M information 146) being controlled by the control server 108. Exemplary customer premises 1 114 information includes, e.g., historical state information corresponding to fan devices located within customer premises 1 102, an approved normal device control schedule for CP1, and a generated away device control schedule for CP1.

120 V input power is received by the power panel 122 via 120V power source input lines 148, 150. The received input power is routed through power panel 122, e.g., passes through a circuit breaker, and is output from the power panel 122, via lines 152, 154, which are input to the safety shutdown switches (132, . . . 142) of the wall control units (114, . . . , 116) of CP 1 102.

The output of safety switch 132, when the switch is in a closed position, powers the internal circuitry on wall control unit 114 and is fed, via lines (156 and 164, 158 and 166) to the input of fan device 1 110. The output of safety switch 142, when the switch is in a closed position, powers the internal circuitry on wall control unit N 116 and is fed, via lines (160 and 168, 162 and 170) to the input of fan device N 112.

RF interface 1 124 of wall control unit 1 114 communicates with fan device 1 110 via RF signals 172. Fan device 1 110 communicates with WIFI router 118 via WiFi signals 176. RF interface N 134 of wall control unit N 116 communicates with fan device N 112 via RF signals 174. Fan device N 112 communicates with WIFI router 118 via WiFi signals 178.

WT 1 120 communicates with WiFi router 118 via WiFi signals 180. In some embodiments, e.g., embodiments supporting Wi-Fi direct, WT 1 120 may directly communicate with fan device 1 110 and fan device N 112 using WiFi signals. WT 1 120 may, and sometimes does, communicate with devices, e.g., control server 108, via the Internet and/or via another WiFi router or a base station when outside customer premises 1 102.

WiFi router 118 includes a WiFi interface, including a WiFi transmitter 196 and a WiFi receiver 195, a network interface includes a receiver 197 and a transmitter 198, a processor 199 and memory coupled together via a bus over which the various elements may interchange data and information. WiFi router 118 communicates with WiFi devices (110, 112, 120) at CP 1 102 via its WiFi interface using WiFi receiver 195 and WiFi transmitter 196. WiFi Router 118 of CP 1 102 communicates with the Internet via the network interface and link 182. A WiFi Router of CP M 104 communicates with the Internet via link 184. Internet 106 is coupled to control server 108 via communications link 186.

Figure 2:
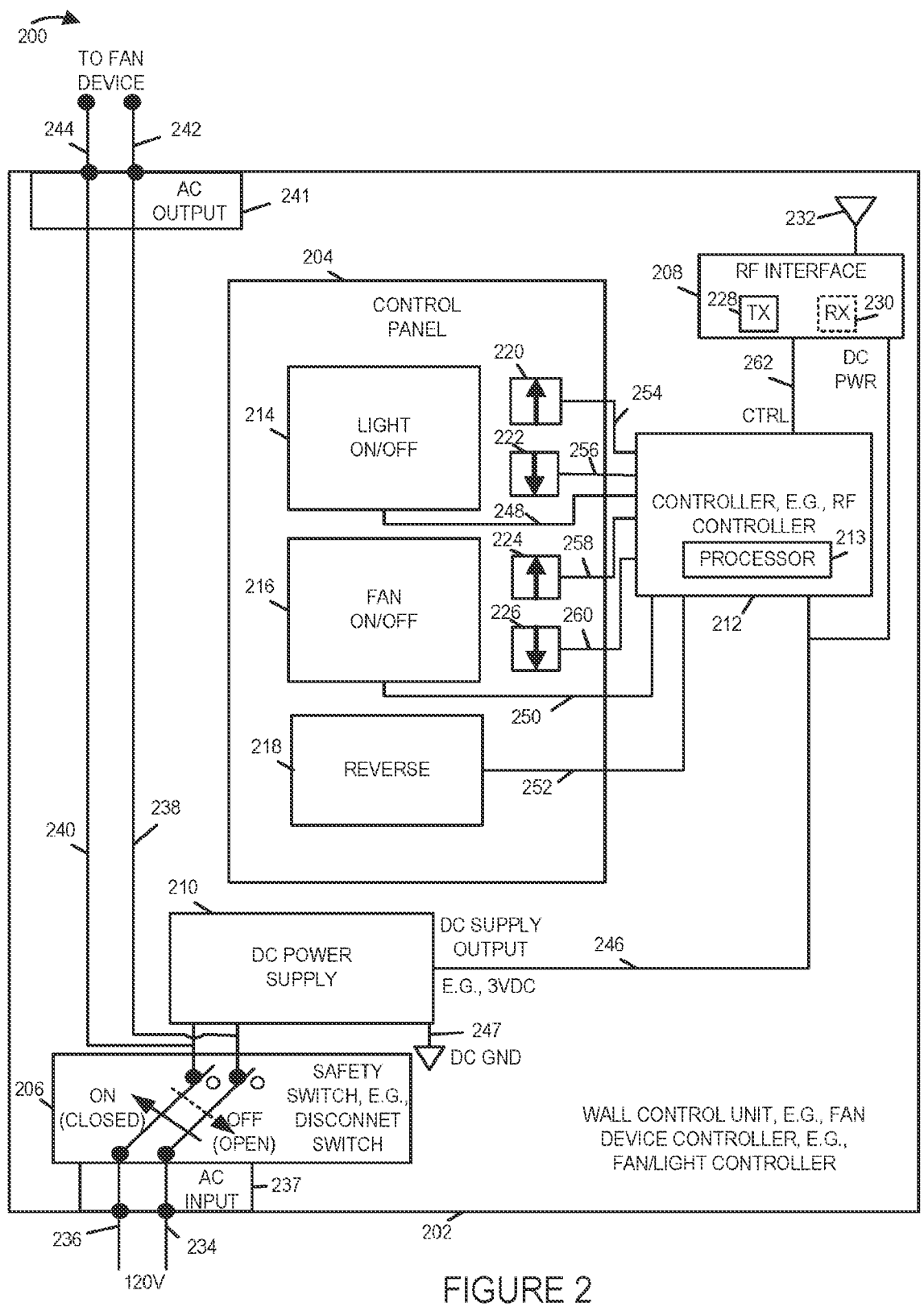
FIG. 2 is a drawing illustrating an exemplary wall control unit, e.g., a fan device controller, including an RF interface in accordance with an exemplary embodiment.

FIG. 2 is a drawing 200 illustrating an exemplary wall control unit 202, e.g., a fan device controller, e.g., a fan/light controller, in accordance with an exemplary embodiment. Exemplary wall control unit 202 is, wall control unit 1 114 or wall control unit N 116 of CP 1 102 of system 100 of FIG. 1. Wall control unit 202 includes a control panel 204, a safety switch 206, an RF interface 208, a DC power supply 210, a controller 212, an AC input 237, and an AC output 241, coupled together as shown in FIG. 2. In various embodiments, the wall control unit 202 does not include a WiFi interface.

Control panel 204 includes a light on/off switch 214, a fan on/off switch 216, a fan reverse switch 218, a light up switch 220, a light down switch 222, a fan speed up switch 224, and a fan speed down switch 226. Light on/off switch 214, e.g., a push button switch, is a light control input for turning a light, e.g., a light in a fan device, on or off. Light on/or switch 214 is coupled to controller 212 via line 248. Fan on/off switch 216, e.g., a push button switch, is a fan control input for turning a fan, e.g., a fan in a fan device, on or off. Fan on/off switch 216 is coupled to controller 212 via line 250. Fan reverse switch 218, e.g., a push button switch, is a fan reverse input for changing the rotation direction of a fan in a fan device. Fan reverse switch 218 is coupled to controller 2 12 via line 252. Fan speed up switch 224, e.g., a push button switch, is a fan speed up input for increasing the speed of a fan in a fan device. Fan speed down switch 226, e.g., a push button switch, is a fan speed down input for decreasing the speed of a fan in a fan device. Light up switch 220, e.g., a push button switch, is a light up input for increasing the light output from a light in a fan device. Light down switch 222, e.g., a push button switch, is a light down input for decreasing the output of a light in a fan device. Fan speed up switch 224, fan speed down switch 226, light up switch 220, and light down switch 222 are coupled to controller 212 via lines (258, 260, 254, 256), respectively.

RF interface 208 includes an RF transmitter 228 and, in some embodiments, an RF receiver 230, which are coupled to antenna 232, via which the wall control 202 may transmit and, in some embodiments, receive RF signals, e.g., to or from a fan device. Exemplary transmitted RF signals include, e.g., an RF control signal communicating a command. In some embodiments, the command is one of: a fan power state change command, a fan speed up command, a fan speed down command, a fan direction change command, a light power state change command, a light increase command, or a light decrease command. An exemplary received RF signal includes, e.g., an acknowledgment of a transmitted command.

In various embodiments, the RF control signals which are sent by control unit 202 to a fan device use an RF frequency which is not used for WiFi signals. In some embodiments, the RF control signals which are sent by control unit 202 to a fan device use a different frequency band and a different protocol than the WiFi signals which are received by the fan device.

120 V Input power lines 234, 236 are coupled, via AC input interface 237, to the input of safety switch 206, e.g., a disconnect switch. The outputs of safety switch 206 are coupled to the input of DC power supply 210 and to lines 238, 240, which are coupled, via AC output interface 241, to a fan device via lines 242, 244. In FIG. 2, safety switch 206 is shown in the ON or closed position in which input AC power is supplied to both the DC power supply 210 and to a fan device which is coupled to the wall control unit 202. When the safety switch is placed in the open or OFF position or disconnect position, AC power is cutoff, e.g., not supplied, to both the input of the DC power supply 210 of wall control unit 202 and to the fan device coupled to wall control unit 202. Safety switch 206, e.g., a disconnect switch, is for disconnecting the AC output 241 from the AC input 237 when the switch 206 is switched to a disconnect state from a connect state. In some embodiments, safety switch 206, e.g., a disconnect switch, is in the form of a push or pull switch or a pull tab which can interrupt the power to the fan device to which the wall control unit 202 is coupled.

DC power supply 210, when receiving input AC power, generates and outputs DC supply output 246, e.g., 3 VDC, which is input to and used by RF interface 208 and controller 212. In some embodiments, the DC power supply 210 generates and outputs multiple DC voltages, e.g., 3 VDC, 5 VDC, 15 VDC and −15 VDC, which are used by the controller 212 and the RF interface 208. The DC power supply 210 is connected to switch 206 and to the RF controller 212. The DC power supply 206 receives AC power from the disconnect switch 206 when switch 206 is in the closed position, and the DC power supply 210 generates DC power from the received AC power and supplies the DC power to the controller 212. If an operator switches the disconnect switch 206 to a disconnect state, power is cut off to both AC output 241 and to the DC power supply 210 at the same time.

Controller 212, e.g., an RF controller, controls the RF interface 208 including RF signal transmitter 228 to generate and transmit RF control signals over line 262 in response to detected control panel input button depressions. Lines can be, for example, wires or traces over which electrical signals can be communicated. RF signal transmitter 228 transmits commands to a device, e.g., a fan device, being controlled. Controller 212, e.g., an RF controller, includes a processor 213 configured to generate a command, e.g., (a light power state change command, a fan power state change command, a fan direction change command, a light increase command, a light decrease command, a fan speed up command, a fan speed down command) in response to received input via an input (light control input 214, fan control input 216, fan reverse input 218, light up input 220, light down input 222, fan speed up input 224, or fan speed down input 226), respectively, and control the RF interface 208 to transmit said generated command in a generated RF signal to a fan device.

Figure 3:
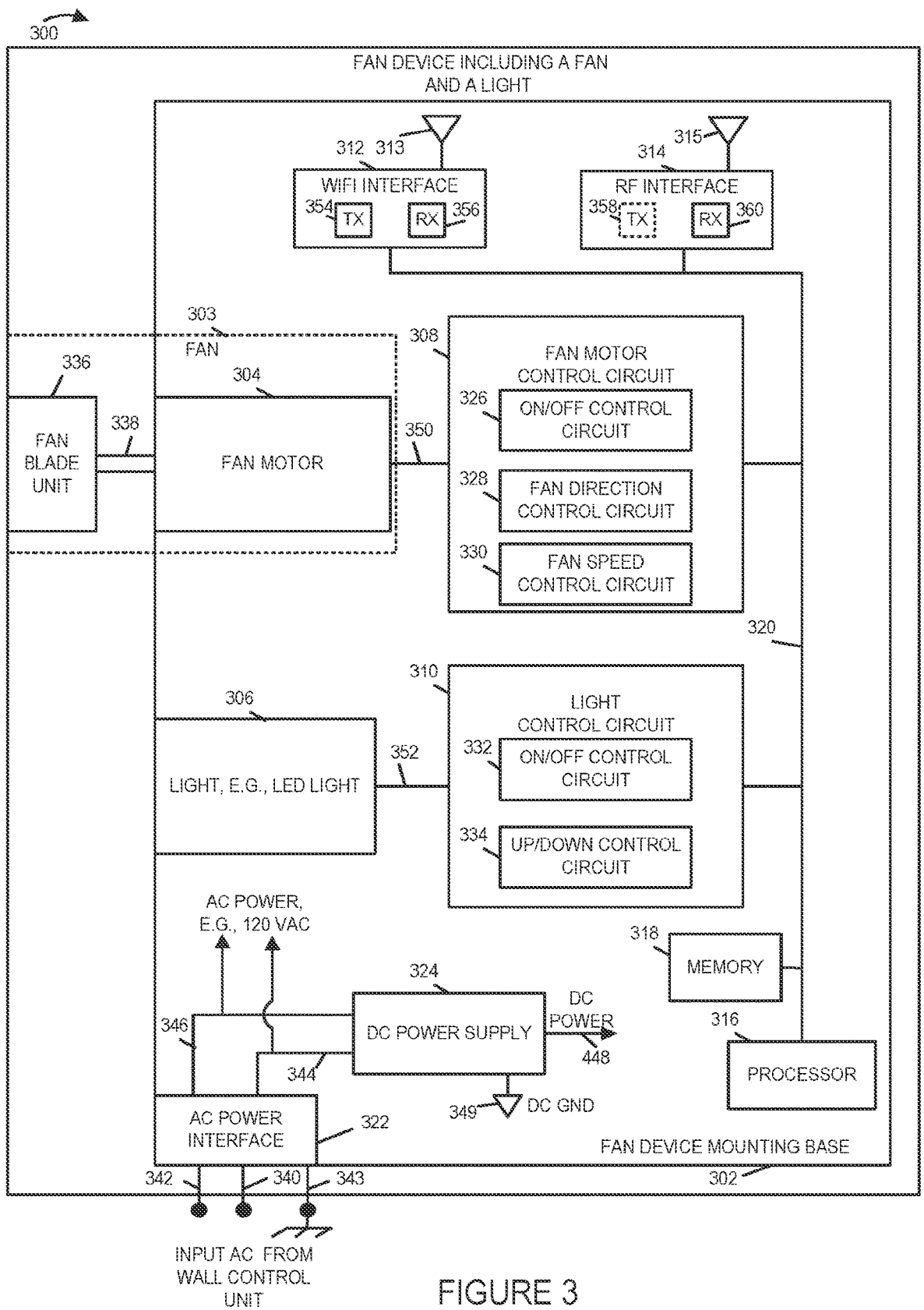
FIG. 3 is a drawing of an exemplary controllable fan device including a controllable fan, a controllable light, an RF interface and a WiFi interface in accordance with an exemplary embodiment.
Figure 4A:
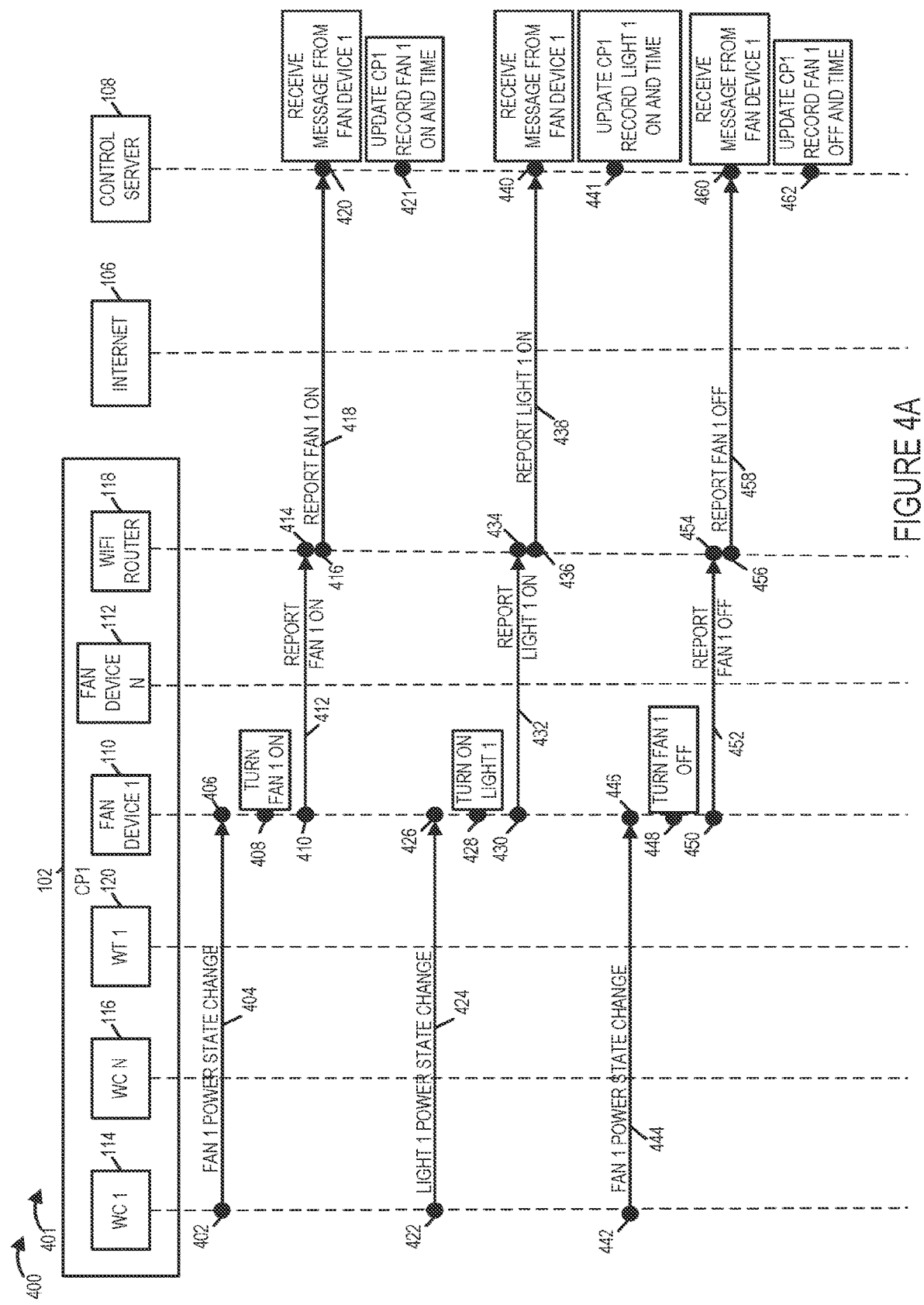
FIG. 4A is a first part of a drawing illustrating an exemplary fan device system, exemplary signaling, and exemplary operations in accordance with an exemplary control method.
Figure 4B:
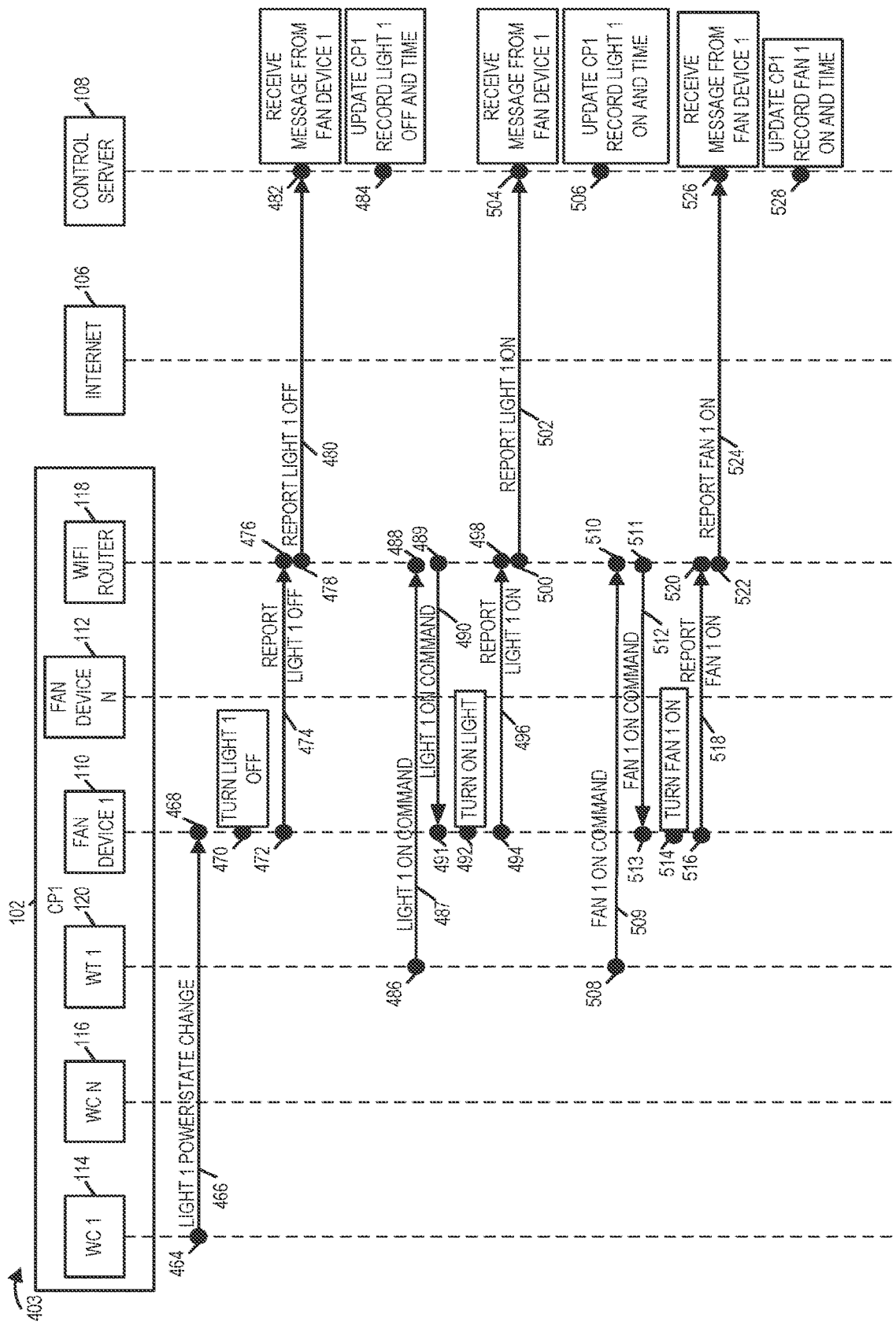
FIG. 4B is a second part of a drawing illustrating an exemplary fan device system, exemplary signaling, and exemplary operations in accordance with an exemplary control method.
Figure 4C:
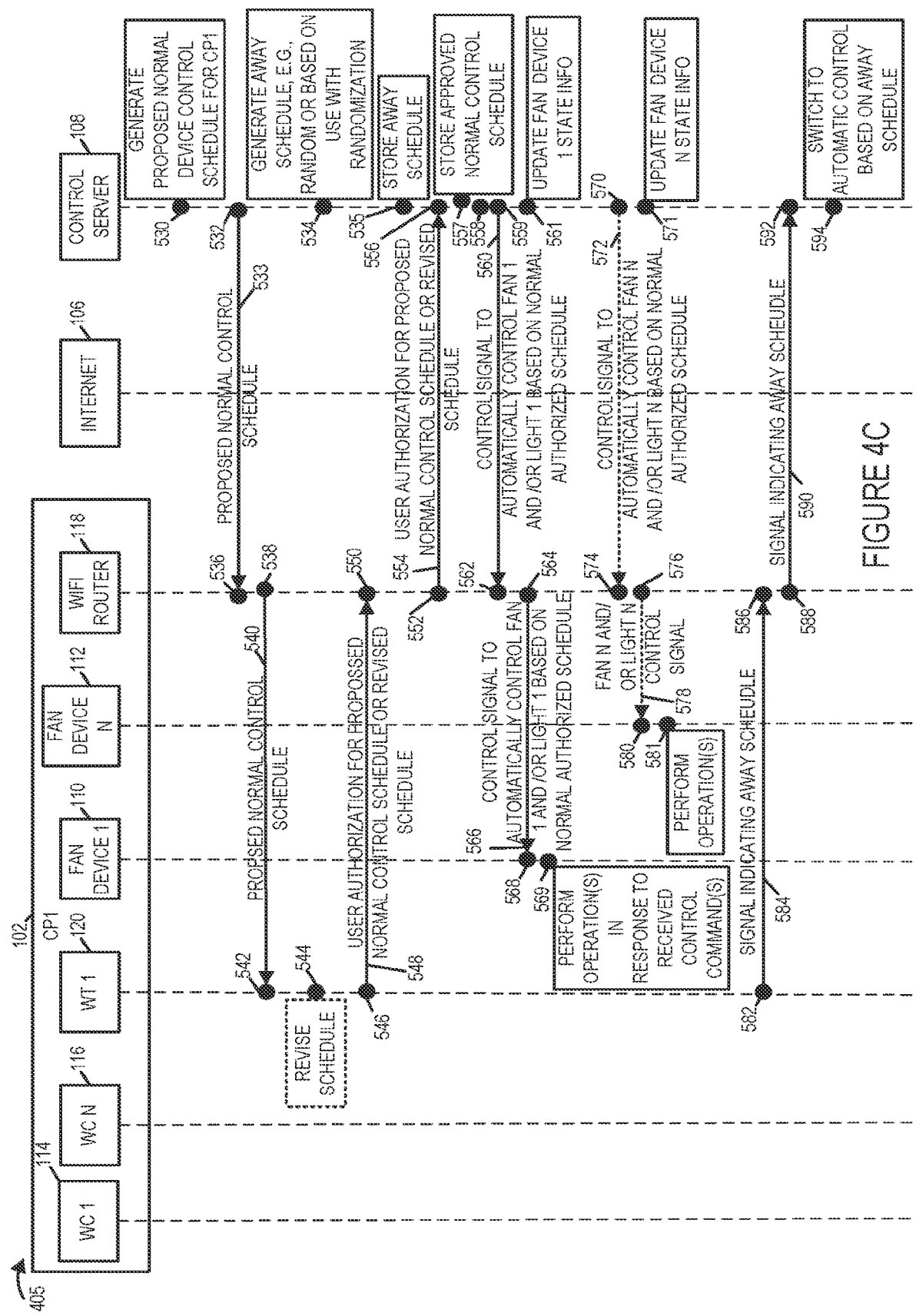
FIG. 4C is a third part of a drawing illustrating an exemplary fan device system, exemplary signaling, and exemplary operations in accordance with an exemplary control method.
Figure 4D:
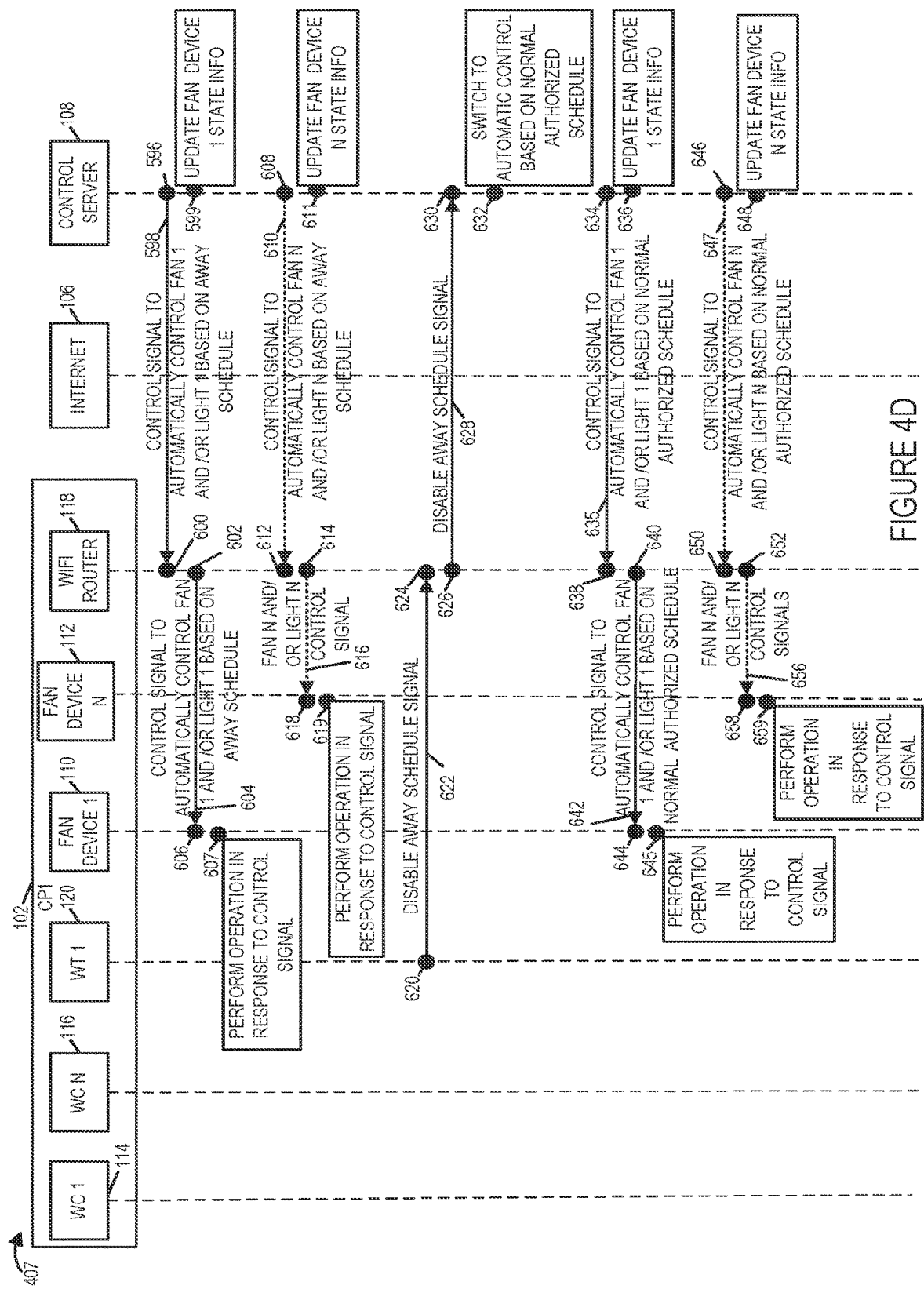
FIG. 4D is a fourth part of a drawing illustrating an exemplary fan device system, exemplary signaling, and exemplary operations in accordance with an exemplary control method.

FIG. 3 is a drawing of an exemplary fan device 300, including a fan 303 and a light 306, in accordance with an exemplary embodiment. Exemplary fan device 300 is, e.g., one of the fan devices (fan device 1 110, ..., fan device N 112) of customer premises 1 102 of system 100 of FIG. 1. Fan 303 includes a fan motor 304, a fan blade unit 336 including fan blades and a hub, and fan motor shaft 338 which couples the fan motor 304 to the fan blade unit. In various embodiments fan motor 304 is a BrushLess DC (BLDC) motor. Exemplary fan device 300 includes a fan device mounting base 302, fan motor shaft 338 and fan blade unit 336. Fan unit mounting base 302 includes a fan motor 304, a light 306, e.g., an LED light, a fan motor control circuit 308, a light control circuit 310, a WIFI interface 312, an RF interface 314, a processor 316, memory 318, an AC power interface 322 and a DC power supply 324. WIFI interface 312 includes a WIFI transmitter 354 and a WIFI receiver 356, which are coupled to antenna 313, via which the fan device 300 can send and receive WiFi signals. Exemplary received WiFi signals communicate, e.g., a fan device control command, and a proposed normal device control schedule. Exemplary fan device control commands received via WiFi receiver 356 include, e.g., a fan on command, a fan off command, a fan power state change command, a fan speed up command, a fan speed down command, a fan direction change command, a fan speed setting level command, a light on command, a light off command, a light power state change command, a light increase command, a light decrease command, and a light level setting command. In some embodiments, an exemplary received WiFi signal, e.g., conveying a control message may, and sometimes does, include multiple commands, e.g., a light on command, a fan on command, a fan direction command, a light level setting command, and a fan speed setting command. Exemplary transmitted WiFi signals communicate, e.g., fan device state information reporting messages, e.g., communicating light on/off status, light output level status, fan on/off status, fan speed, fan direction. RF interface 314 includes an RF receiver 360, and in some embodiments, and RF transmitter 358, which are coupled to antenna 315, via which the fan device 300 can send and receive RF signals. Exemplary received RF signals include, e.g., signals communicating fan device control commands, e.g., from a wall control unit 202. Exemplary control commands communicated via RF signals include, e.g., a fan power state change command, a fan speed up command, a fan speed down command, a light power state change command, a fan direction change command, a light power state change command, a light increase command, and a light decrease command. Exemplary transmitted RF signals include, fan device control acknowledgment signals. In various embodiments, the WiFi interface 312 and the RF interface 314 are configured to use different frequency bands, e.g., different non-overlapping frequency bands, and different communications protocols. In some embodiments, the same antenna is used for both the WiFi interface 312 and the RF interface 314.

WiFi interface 312, RF interface 314, fan motor control circuit 308, light control circuit 310, processor 316 and memory 318 are coupled together via a bus 320 over which the various elements may interchange data and information. Fan motor control circuit 308 includes an On/Off control circuit 326, a fan direction control circuit 328, and a fan speed control circuit 330. In some embodiments, the fan motor control circuit 308 includes an Insulated Gate Bipolar Transistor (IGBT) module, a processor, and analog feedback circuitry. The fan motor control circuit 308 is coupled to fan motor 308 via cable 350. Fan motor shall 338 couples the fan motor to the fan blades 336. Light control circuit 310 includes an On/Off control circuit 332 and an Up/Down control circuit 334. The light control circuit 310 is coupled to light 306 via cable 352. Fan on/off control circuit 326 controls whether or not power is applied to fan motor 304, e.g., in response to received fan power state change control commands, fan power on control commands, and fan power off control commands. Fan direction control circuit 328 controls the direction fan motor 304 turns, e.g., in response to received fan direction change commands, and fan direction commands. Fan speed control circuit 330 controls the speed of fan motor 304, e.g., in response to received fan speed up commands, fan speed down commands, and fan speed setting level commands. In various embodiments, the fan motor control circuit 308 is configured to control the fan to operate at a predetermined speed and direction when initially commanded to power on from an off state, unless specified otherwise, e.g., in a schedule or by a command. Light on/off control circuit 332 controls whether or not power is applied to light 306, e.g., in response to a received light power state change control commands, light power on control commands, and light power off control commands. Light up/down control circuit 334 controls the light output level of light 306, e.g., in response to received light increase commands, light decrease commands, and light level setting commands. In some embodiments, the light level is changed by changing the voltage or current supplied to a light or a set of lights. In some embodiments, the light level is changed by changing the number of lights to which power is applied in a set of lights. In various embodiments, the light control circuit 310 is configured to control the light 306 to operate at a predetermined output level when initially commanded to power on from an off state, unless specified otherwise, e.g., in a schedule or by a command.

Input AC, e.g., 120 VAC, is received from a wall control unit via inputs 340, 342. AC power interface 322 conditions the received AC, e.g., performing filtering, and outputs conditioned AC power on lines 344, 346, which are used as input by other elements within fan device 300, e.g., the fan motor 304 or fan motor control circuit 308, the light 306 or the light control circuit 310, and the DC power supply 324. DC power supply 324 generates and outputs one or more DC voltages, e.g., 170 VDC, 3.3 VDC, 16 VDC, 3 VDC, +5 VDC, 15 VDC, and/or −15 VDC from the input AC power received via lines 344, 346. Output DC power is via DC power bus 448 and the DC voltages are referenced with respect to DC ground 349. In some embodiments, the DC power supply includes one of more current supplies in addition to one or more voltage supplies. DC power from DC power supply 324 is supplied to and used by processor 316, memory 318, WiFi interface 312, RF interface 314, fan motor control circuit 308, light control circuit 310, and in some embodiments, light 306 and/or fan motor 304. While known DC motor fan systems that are available experience problems when controlled over the same the same power run, e.g., when three fans are daisy chained together so that power is connected to a first fan and from the first fan to a second fan and then a third fan, the third fan typically does not operate properly it experiences being off kilter in time and speed on start, use of the circuitry shown in FIG. 9 in connection with a DC motor results in proper operation of all three fans daisy chained together wherein smooth control of fan operation in the three DC motors can be achieved. Furthermore, in some embodiments, in which a DC brushless motor was utilized smooth control of fan motor operation was achieved without use of optical sensors in the motor control unit.

Processor 316 is configured to control the RF interface 314 including RF receiver 360 to receive RF control signals, recover the control command or commands being communicated and communicate the recovered control command or commands to the fan motor control circuit 308 and/or light control circuit 310 or send information to the fan motor control circuit 308 and/or light control circuit 310 to be used to implement the recovered control command or commands. Processor 316 is further configured to control the WiFi interface 312 including WiFi receiver 356 to receive WiFi signals including messages communicating control commands, recover the control command or commands being communicated and communicate the recovered control command or commands to the fan motor control circuit 308 and/or light control circuit 310 or send information to the fan motor control circuit 308 and/or light control circuit to be used to implement the recovered control command or commands. Processor 316 is further configured to generate device status reporting messages and to control the WiFi interface including transmitter 354 to transmit WiFi signals including the device status reporting messages communicating device state information. In various embodiments, processor 316 is configured to generate and send a device status reporting message, e.g., in response to a received and implemented RF control signal or a received and implemented WiFi control message. In some embodiments, the processor 316 is configured to limit time intervals between successive device status reporting messages, e.g., to prevent excessive status reporting messages such as where an individual is pushing an input button on a wall control unit 202 multiple times in very short time interval. In one exemplary embodiment, a device status reporting message is sent to a control server at most once per predetermined time interval, e.g., once per two second time interval or once per two minute time interval. In some embodiments, device status reporting messages to the control server communicates a change from a previously communicated device status reporting message. In various embodiments, a device status reporting message can, and sometimes does, include an aggregate of multiple received and implemented commands. In various embodiments, a generated device status reporting message includes time tag information, e.g., a transmission time tag and/or a time tag or time tags corresponding to an implemented state change or changes implemented at the fan device. In some embodiments, the fan device includes a single circuit board that includes the WIFI interface 312, RF interface 314, fan motor control circuit 308, light control circuit 310, AC power interface 322, DC power supply 324, memory 318 and processor 316.

FIG. 4, comprising the combination of FIG. 4A, FIG. 4B, FIG. 4C, FIG. 4D and FIG. 4E, is a drawing 400, comprising Part A 401, Part B 403, Part C 405, Part D 407 and Part E 409, illustrating exemplary components of system 100 of FIG. 1, exemplary signaling and exemplary operations in accordance with an exemplary embodiment. Drawing 400 includes customer premises CP 1 102, the Internet 106, and control server 108. CP 1 102 includes wall control unit 1 114, wall control unit N 116, fan device 1 110, fan device N 112, and WiFi router 118. Fan device 1 110 includes fan 1 and light 1. Fan device N 112 includes fan N and light N. Wireless terminal 120 is a mobile device, e.g., a cell phone, a laptop, a tablet, a smartphone, which is sometimes located within CP 1 102 and is sometimes located outside of CP 1 102.

In one exemplary embodiment, fan device 1 110 and wall control unit 1 116 are located in a first room, and fan device N 116 and wall control unit N 116 are located in a second room, which is a different room from the first room. In some embodiments, the fan devices 110, 112, each include a RF interface and a WiFi interface, while the wall control units 114, 116 each include a RF interface but do not include a WiFi interface. In one exemplary embodiment, wall control unit 1 114, is a wall mounted unit, which supplies power to fan device 1 110; and wall control unit N 116, is a wall mounted unit, which supplies power to fan device N 112.

In some embodiments, the RF and WiFi interfaces while both being wireless interfaces are different interfaces and use different frequency bands and different communications protocols. In some embodiments, the RF interfaces use a sub-GHz frequency band, e.g., 315 MHz or 433 Mhz, and the WiFi interfaces use a 2.4 GHz frequency band. In some embodiments, the RF interfaces use ON OFF KEYING (OOK) 2kSymbols/sec, Manchester Encoded protocol. In some embodiments, the WiFi interfaces use a 802.11 b/g/n protocol.

Drawing 400 is an exemplary signaling diagram illustrating exemplary signaling between the various devices and exemplary operations performed by the devices in accordance with an exemplary method.

In step 402 WC 1 114 generates and sends radio frequency (RF) control signal 404, e.g., a wireless RF signal, to fan unit 1 110 commanding fan unit 1 110 to change the power state of its fan. In some embodiments, the RF control signal 404 is sent using an RF signal which is not used for WiFi signals. In step 406 fan unit 1 110 receives signal 404 and recovers the communicated command. Consider that the fan in fan device 1 110 is currently off. In response to the received recovered command in RF signal 404, in step 408 fan unit 1 110 turns on its fan, which is fan 1. In step 410, fan device 1 110 generates and sends a reporting message 412 to WiFi router 1 114 reporting that fan 1 is on.

In one exemplary embodiment, the reporting message 412 includes: an identifier identifying fan device being controlled, which in this example is fan device 1 110, information indicating the time the command was implemented, information indicating the operation performed by the fan device, which in this example is turning on the fan in fan device 1 110, and information identifying the customer premises, which in this example is CP1 102. Other reporting messages described in this signaling flow diagram may also use this exemplary reporting format. The reporting allows the server 108, which is the intended end point recipient of the reporting message information, to create a log of the state of fan device 1 and create a history of the state of the device. Recorded state information corresponding to multiple fan devices at CP1 may be used to facilitate learning of use patterns and thereby allow for automated schedule generation for both normal and away schedules both of which may be, and sometimes are, machine learning based on the information reported to the control server 108 in system 100.

In step 414 WiFi router 118 receives message 412 and recovers the communicated information. In step 416 WiFi router 118 generates reporting message 418, indicating that fan 1 is on, and sends message 418, via the Internet 106, to control server 108. In step 420 control server 108 receives message 418 and recovers the communicated information, originally sourced from fan device 1, which indicates that the fan 1 in fan device 1 is on. In step 421 control server 108 updates the customer premises 1 (CP1) information to record that fan 1 is on and the time.

In step 422 WC 1 114 generates and sends RF control signal 424 to fan device 1 110 commanding fan unit 1 110 to change the power state of its light, which is light 1. In step 426 fan unit 1 110 receives RF signal 424 and recovers the information communicated. Consider that light 1 is in an OFF state. In response to the recovered command of signal 424, in step 428 fan device 1 110 turns on light 1. In step 430, fan device 1 110 generates and sends a reporting message 432 to WiFi router 1 118 reporting that light 1 is on. In step 434 WiFi router 118 receives message 432 and recovers the communicated information. In step 436 WiFi router 118 generates reporting message 438, indicating that light 1 is on, and sends message 438, via the Internet 106, to control server 108. In step 440 control server 108 receives message 438 and recovers the communicated information, originally sourced from fan device 1, which indicates that light 1 is on. In step 441 control server 108 updates the customer premises 1 (CP1) information to record that light 1 is on and the time.

In step 442 WC 1 114 generates and sends RF signal 444 to fan device 1 110 commanding fan device 1 110 to perform a fan power state change. In step 446 fan device 1 110 receives signal 444 and recovers the information communicated, and in response in step 448 fan device 1 110 turns off fan 1. In step 450, fan device 1 110 generates and sends a reporting message 452 to WiFi router 1 118 reporting that fan 1 is off. In step 454 WiFi router 118 receives message 452 and recovers the communicated information. In step 456 WiFi router 118 generates reporting message 458, indicating that fan 1 is off, and sends message 458, via the Internet 106, to control server 108. In step 460 control server 108 receives message 458 and recovers the communicated information, originally sourced from fan device 1 110, which indicates that fan 1 is off in step 462 control server 108 updates the customer premises 1 (CP1) information to record that fan 1 is off and the time.

In step 464 WC 1 114 generates and sends RF signal 466 to fan device 1 110 commanding fan device 1 110 to perform a power state change of its light, which is light 1. In step 468 fan device 1 110 receives signal 466 and recovers the information communicated, and in response in step 470 fan device 1 110 turns off light 1. In step 472, fan device 1 110 generates and sends a reporting message 474 to WiFi router 1 118 reporting that light 1 is off.

In step 476 WiFi router 118 receives message 474 and recovers the communicated information. In step 478 With router 118 generates reporting message 480, indicating that light 1 is off, and sends message 480, via the Internet 106, to control server 108. In step 482 control server 108 receives message 480 and recovers the communicated information, originally sourced from fan device 1 which indicates that light 1 is off. In step 484 control server 108 updates the customer premises 1 (CP1) information to record that light 1 is off and the time.

In step 486 WT 1 120, which is a device supporting WiFi communications, generates and sends WiFi control signal 487 to WiFi router 118 commanding fan device 1 110 to turn on its light, which is light 1. In step 488 WiFi router 118 receives signal 487 and recovers the information communicated. In step 489 WiFi router 118 generates and sends WiFi signal 490 to fan device 1 110 communicating the command to turn on its light. In step 491 fan device 1 110 receives signal 490 and recovers the information communicated, and in response in step 492 fan device 1 110 turns on light 1. Thus the control command of signal 487 is communicated from WT 1 120, which is a WiFi device currently located within CP1 102, to fan device 110, located at CP1 102, via Win router 118, also located at CP1 102, without the command traversing a network outside the customer premises CP1 102. Thus in some embodiments, at least some times, the communication of a command, e.g., in a WiFi signal, to a fan device does not depend or involve communication over a network outside the customer premises, and the fan device can be controlled from within the CP, e.g., house, via WiFi even if an Internet or server connection to the server is not present or available.

In step 494, fan device 1 110 generates and sends a reporting message 496 to WiFi router 1 118 reporting that light 1 is on. In step 498 WiFi router 118 receives message 496 and recovers the communicated information. In step 500 WiFi router 118 generates reporting message 502, indicating that light 1 is on, and sends message 502, via the Internet 106, to control server 108. In step 504 control server 108 receives message 502 and recovers the communicated information, originally sourced from fan device 1 110, which indicates that light 1 is on. In step 506 control server 108 updates the customer premises 1 (CP1) information to record that light 1 is on and the time.

In step 508 WT 1 120 generates and sends WiFi signal 509 to WiFi router 118 commanding fan device 1 110 to turn on its fan. In step 510 WiFi router 118 receives signal 509 and recovers the communicated information. In step 511, WiFi router 118 generates and sends WiFi signal 512 to fan device 1 110 communicating the fan 1 on command. In step 513 fan unit 1 110 receives signal 512 and recovers the information communicated, and in response in step 514 fan device 1 110 turns on fan 1. In step 516, fan device 1 110 generates and sends a reporting message 518 to WiFi router 1 114 reporting that fan 1 is on. In step 520 WiFi router 118 receives message 518 and recovers the communicated information. In step 522 WiFi router 118 generates reporting message 524, indicating that fan 1 is on, and sends message 524, via the Internet 106, to control server 108. In step 526 control server 108 receives message 524 and recovers the communicated information, originally sourced from fan device 1 110, which indicates that fan 1 is on. In step 528 control server 108 updates the customer premises 1 (CP1) information to record that fan 1 is on and the time. Although the control messages and reporting message, corresponding to fan device 1 110, have been shown for on/off examples, in some embodiments, the control messages which are sent may control other operations, e.g., increase light intensity of light 1, decrease light intensity of light 1, increase fan speed of fan 1, decrease fan speed of fan 1, change fan direction of fan 1, and the reporting messages may report device status or device status change in response to those commands.

Exemplary on/off device control signaling, state changes, reporting, and recording of device status in control server 108, has been shown over time, for a few examples, for fan device 1 110 including fan 1 and light 1. It should be appreciated that similar signaling and operations are performed with regard to the other fan devices, e.g., fan device N 112, located at customer premises 1 102, and control server 108 also records and builds up a historical record corresponding to status including state information of the other fan devices located at CP1 102, e.g., fan device N 112, over time.

In step 530, the control server 108 generates a proposed normal device control schedule for customer premises 1 102, e.g., based on historical recorded information. The generated proposed normal control schedule for CP1 is a fan and lighting control schedule for controlling the fan devices at CP1 including, e.g., on/off fan control schedule, on/off light control schedule, fan speed schedule, fan direction schedule, and light intensity schedule. In some embodiments, the proposed normal device control schedule is generated based on stored information including the state of one or more fan devices (fan device 1 110, . . . , fan device N 112) at CP1 102 over a period of time, e.g., two or more weeks, e.g., based on collected stored reporting messages from the fan devices (110, . . . , 112) over the time period. In step 532, the control server generates a message 533 communicating the generated proposed normal device control schedule and sends the generated message to WiFi router 118, via Internet 106.

In step 534 the control server 108 generates an away device control schedule for CP1 102, e.g., random based or based on historical use with randomization. In various embodiments, server 108 generates the away schedule to be used to control one or more fan devices (110, . . . , 112) at CP1 102 when the customer indicates that they are away from the customer premises 102. In some embodiments, operating the control server 108 to generate an away schedule includes generating said away schedule as a function of a random function used to at least partially randomize the on or off tunes of one or more devices. In some embodiments, operating the server 108 to generate the away schedule includes using information about past device on and of status in combination with said random function to control the on and off times as a function of at least one device, said on and off times deviating from historical on and off times by an amount of time which does not exceed a set maximum amount of time, e.g., 30 minutes, and which is determined by said random function. For example, once the historical on/off times of a light on the fan device are known the random function is used to change the on/off time in a random function but keep it within 30 minutes or so of the normal on/off time so that the on/off pattern is not identical from day to day but within an expected normal range that might occur to a human getting home or moving around the home which would not be identical each day but might not deviate greatly, e.g., by more than an hour, from day to day. In step 535 control server 108 stores the generated away device control schedule for CP1 102.

In step 536, WiFi router 118 receives message 533 and recovers the information in message 533 including the proposed normal device control schedule. In step 538, WiFi router 118, generates a message 540 including the proposed normal device control schedule and sends the message 540 to WT 1 120. Thus the generated proposed normal device control schedule has been communicated from control server 108, via the Internet 106 and WiFi router 118, located at CP1, to device WT 1 120 corresponding to the first customer premises. WT 1 120 is, e.g., the cell phone, e.g., a smartphone, of a user who is located at the first customer premises 102.

In step 542, WT 1 120 receives message 540 recovers the proposed normal control schedule and presents the proposed normal device control schedule to the user of WT 1 120. In some embodiments, the user of device 1 120 may decide to revise the proposed normal device control schedule. In step 544, WT 1 120 receives user input revisions and generates a revised normal device control schedule. In step 546, WT 1 120 generates a message 548 communicating user authorization for the proposed normal device control schedule or a revised normal device control schedule and sends message 548 to WiFi router 118. In step 550, WiFi router 118 receives message 550 and recovers the communicated information. In step 552 WiFi router 118 generates message 554 communicating the user authorization for the proposed normal device control schedule or the user revised normal device control schedule and sends message 554 via Internet 106 to control server 108.

In step 556, the control server receives message 554 and recovers the communicated user authorization for the proposed normal device control schedule or the communicated revised normal device control schedule. If user authorization is received for the suggested normal control schedule, the control server 108 designates the generated suggested control schedule as a normal approved device control schedule. If a revised normal device control schedule is received, the control server 108 designates the received revised schedule as the normal approved device control schedule. In step 557 the control server stores the approved normal control schedule.

In step 558, the control server 108 starts operating in accordance with the approved normal device control schedule, e.g., to automatically control operations at fan device 1110 and fan device N 112 of CP1 102. In various embodiments, operating the control server 108 in accordance with the stored approved normal control schedule includes operating the server 108 to control one or more of the fan devices (110, . . . , 112) at CP1 102 based on the normal approved device control schedule including transmitting a control signal from control server 108 to fan device 1 110 via the Internet 106 and WiFi router 118 to control fan device 1 to take an action at a time indicated in the normal approved device control schedule, e.g., to control the fan of fan device 1 110 to turn on at a time indicated by the normal approved device control schedule.

In some embodiments, the control server 108 will switch to automatic operations in accordance with the approved normal device control schedule based on the reception of message 554, e.g., once the proposed schedule is approved the control server starts using the approved normal device control schedule.

In some embodiments, the control server 108 will not switch to automatic operations in accordance with the approved normal device control schedule until receiving an additional message, e.g., a normal device control schedule activation message from a user, e.g., the user which approved the proposed normal schedule or sent the revised normal schedule. In some embodiments, the user may send server 108, e.g., from device WT 1 120, a message communicating one or more time intervals in which the control server 108 is to operate in accordance with the approved normal device control schedule and/or one or more time intervals in which the control server 108 is to operate in accordance with the away schedule and/or one or more time intervals in which the control server 108 is not to use either the normal schedule of the away schedule hut is to allow just wall control units and user devices such as WT 1 to control the fan devices at CP1.

In step 559, the control server 108, operating in accordance with the normal approved control schedule, generates and sends control signal 560 including one or more control commands, via. Internet 106, to WiFi router 118 to automatically control fan 1 and/or light 1 of fan device 1 110 based on the normal authorized device control schedule. In step 561 the control server 108 updates fan device 1 state information based on the control commands sent in message 560. In step 562, the WiFi router 118 receives control signal 560 and recovers the communicated information, e.g., control command or commands directed to fan device 1 110. In step 564, the control server generates and sends control signal 566 to automatically control fan 1 and/or light 1 of fan device 1 110. In step 568, fan device 1 110 receives control signal 566 and recovers the control information communicated. In step 569 fan device 1 110 performs an action or actions m response to one or more recovered control commands in the received WiFi signal 566, e.g., turns off fan 1, turns off light 1, reverses the direction of fan 1, increases fan 1 speed, decreases fan 1 speed, sets fan 1 speed to a particular value, increases light 1 intensity, decreases light 1 intensity, sets light 1 intensity to a particular level, etc.

In step 570, the control server 108, operating in accordance with the normal approved control schedule, generates and sends control signal 572 including one or more control commands, via Internet 106, to WiFi router 118 to automatically control fan N and/or light N of fan device N 112 based on the normal approved device control schedule. In step 571 the control server 108 updates fan device N state information based on the control commands sent in message 572, In step 574, the WiFi router 118 receives control signal 572 and recovers the communicated information. In step 576, the WiFi router 118 generates and sends control signals 578 to automatically control fan N and/or light N to fan unit N 112. In step 580, fan unit N 112 receives control signals 578, recovers the control information, e.g., control command or commands communicated in signal 578. In step 581 fan device N 112 performs an action or actions in response to the one or more received and recovered control commands in WiFi control signal 578, e.g., turns on fan N, turns off fan N, turns on light N, turns off light N, reverses the direction of fan N, increases fan N speed, decreases fan N speed, increase light N intensity, decreases light N intensity, sets the speed of fan N to a particular level, sets the light output level of light N to a particular level, etc.

Although only one arrow is shown for control signal 560, and corresponding forwarded control signal 566, to illustrate one example, it should be appreciated that many different control signals, e.g., individual control signals may be, and in some embodiments, are sent at different times to achieve different desired states of operation of fan unit 1, in accordance with the normal authorized device control schedule. Although only one arrow is shown for control signals 572, and corresponding forwarded control signals 578, it should be appreciated that many different control signals, e.g., individual control signals may be, and in some embodiments, are sent at different times to achieve different desired states of operation of fan unit N, in accordance with the normal authorized schedule.

In step 582, based on received user input, WT 1 120 generates a signal 584 indicating that the away device control schedule should be used to control the fan units at customer premises 1, and WT 1 120 sends the signal 584 to WiFi router 118. In some embodiments, signal 584 conveys an away status indicator from the user of user device WT 1 120. In step 586, Wifi router 118 receives signal 584, recovers the communicated information. In step 588 WiFi router 118 generates and sends signal 590 including information indicating that the control server should use the away schedule for customer premises 1, via Internet 106, to control server 108. In step 592 control server 108 receives signal 590 and recovers the communicated information, e.g., the away status indicator, indicating that the away schedule should now be used for CP1. In step 594, in response to received message 590, the control server 108 switches to automatic control of the fan units at customer premises 1 based on the away device control schedule. Thus the control server 108 switches from using the stored approved normal schedule to using the stored away schedule to control the one of more fan devices (110, . . . , 112) at the first customer premises.

In step 596, the control server 108, operating in accordance with the away device control schedule, generates and sends control signal 598 including one or more control commands, via Internet 106, to WiFi router 118 to automatically control fan 1 and/or light 1 of fan device 1 110 based on the away device control schedule. In step 599 the control server 108 updates fan device 1 state information based on the control commands sent in message 598. In step 600, the WiFi router 118 receives control signal 598 and recovers the communicated information, e.g., control command or commands directed to fan device 1 110. In step 602, the control server 108 generates and sends control signal 604 to automatically control fan 1 and/or light 1 of fan device 1 110. In step 606, fan device 1 110 receives control signal 604, recovers the control information communicated. In step 607 fan device 1 110 performs an action or actions in response to one or more recovered control commands in the received WiFi control signal 606, e.g., turns off fan 1, turns off light 1, reverses the direction of fan 1, increases fan 1 speed, decreases fan 1 speed, sets fan 1 speed to a particular value, increases light 1 intensity, decreases light 1 intensity, sets light 1 intensity to a particular level, etc, said recovered control commands having been originally sent from control server 108.

In step 608, the control server 108, operating in accordance with the away device control schedule, generates and sends control signal 610 including one or more control commands, via Internet 106, to WiFi router 118 to automatically control fan N and/or light N of fan device N 112 based on the away device control schedule. In step 611 the control server 108 updates fan device N state information based on the control commands sent in message 610. In step 612, the WiFi router 118 receives control 610 and recovers the communicated information. In step 614, the control server generates and sends control signals 616 to automatically control fan N and/or light N to fan unit N 112. In step 618, fan unit N 112 receives control signals 616, recovers the control information, e.g., control command or commands communicated in signal 616. In step 619 fan device N 1 12 performs an action or actions in response to the one or more received and recovered control commands in WiFi control signal 578, e.g., turns on fan N, turns off fan N, turns on light N, turns off light N, reverses the direction of fan N, increases fan N speed, decreases fan N speed, increases light N intensity, decreases light N intensity, sest the speed of fan N to a particular level, sets the light output level of light N to a particular level, etc, said recovered control commands having been originally sent from control server 108.

Although only one arrow is shown for control signal 598, and corresponding forwarded control signal 604, to illustrate one example, it should be appreciated that many different control signals, e.g., individual control signals may be, and in some embodiments are, sent at different times to achieve different desired states of operation of fan unit 1, in accordance with the away device control schedule.

Although only one arrow is shown for control signal 610, and corresponding forwarded control signal 616, it should be appreciated that many different control signals, e.g., individual control signals may be, and in some embodiments are, sent at different times to achieve different desired states of operation of fan unit N, in accordance with the away schedule.

In step 620, based on received user input, WT 1 120 generates a signal 622 indicating that the away device control schedule, used to control the fan units at customer premises 1, and WT 1 120, should be disabled and that the approved normal device control schedule should be used again, sends the generated signal 622 to WiFi router 114. In step 624, WiFi router 118 receives signal 622, recovers the communicated information. In step 626 WiFi router 118 generates and sends signal 628 including information indicating that the control server should disable use of the away schedule for customer premises 1 and resume using the approved normal device control schedule, via Internet 106, to control server 108. In step 630 control server 108 receives signal 628 and recovers the communicated information indicating that the away schedule should no longer be used for CP1 102 and that the normal schedule should now be used. In step 632, in response to received message 628, the control server 108 switches to automatic control of the fan devices 110, 112 at customer premises 1 102 based on the normal authorized approved device control schedule.

In step 634, the control server 108, operating in accordance with the normal approved control schedule, generates and sends control signal 635 including one or more control commands, via Internet 106, to WiFi router 118 to automatically control fan 1 and/or light 1 of fan device 1 110 based on the normal authorized device control schedule. In step 636 the control server 108 updates fan device 1 state information based on the control commands sent in message 635. In step 638, the WiFi router 118 receives control signal 635 and recovers the communicated information, e.g., control command or commands directed to fan device 1 110. In step 640, the WiFi router 118 generates and sends control signal 642 to automatically control fan 1 and/or light 1 of fan device 1 110. In step 644, fan device 1 110 receives control signal 642, recovers the control information communicated. In step 645 fan device 1 110 performs an action or actions in response to one or more recovered control commands in the received WiFi signal 642, turns off fan 1, turns off light 1, reverses the direction of fan 1, increases fan 1 speed, decreases fan 1 speed, sets fan 1 speed to a particular value, increases light 1 intensity, decreases light 1 intensity, sets light 1 intensity to a particular level, etc.

In step 646, the control server 108, operating in accordance with the normal approved control schedule, generates and sends control signal 647 including one or more control commands, via Internet 106, to WiFi router 118 to automatically control fan N and/or light N of fan device N 112 based on the normal approved device control schedule. In step 648 the control server 108 updates fan device N state information based on the control commands sent in message 647. In step 650, the WiFi router 118 receives control signal 647 and recovers the communicated information. In step 652, the control server generates and sends control signals 656 to automatically control fan N and/or light N to fan unit N 112. In step 658, fan unit N 112 receives control signals 656, recovers the control information, control command or commands communicated in signal 656. In step 659 fan device N 112 performs an action or actions in response to the one or more received and recovered control commands in WiFi control signal 656, e.g., turns on fan N, turns off fan N, turns on light N, turns off light N, reverses the direction of fan N, increases fan N speed, decreases fan N speed, increases light N intensity, decreases light N intensity, sets the speed of fan N to a particular level, sets the light output level of light N to a particular level, etc.

In FIG. 4E, it may be observed that mobile WT 1 120 has moved to a location outside CP1 102. In various embodiments, an authorized user can, and sometimes does, control fan devices from outside the customer premises at which the fan devices are located. Consider that the operator of WT 1 120 is authorized to control fan devices 110, 112 from locations outside customer premises 1 102. WT 1 120 may, and sometimes does, request and receive fan device status information for CP1 102, while outside CP1. In step 660 WT 1 120 generates and sends a device control signal 662 for controlling fan device 1 110 to control server 1 108, e.g., via the Internet 106. In step 664, control server 108 receives signal 662 and recovers the communicated information, e.g., a command to turn on light 1 of fan device 1 110 and/or another command or commands. In step 666, control server 108 determines, e.g., based on received authorization information, that it will serve as a relay to relay the received device control signal command to fan unit 1 110. In step 668, the control server 108 generates and sends device control signal 670, conveying the control command or commands received in signal 662, to WiFi router 118, with the destination of the information being fan device 1 110, Some embodiments include step 671, in which the control server 108 updates fan device 1 state information based on the command or commands in transmitted signal 670, in response to transmitting signal 670. Thus in this example, state information is updated without receiving a report of the command being implemented at fan device 1 110.

In step 672, WiFi router 118 receives device control signal 670. In step 674 WiFi router 118 generates and sends device control signal 676, which includes the received command or commands being relayed, to fan device 1 110, thus communicating the control command or command in signal 662, to fan device 1 110. In step 678 fan device 1 110 receives signal 676, recovers the communicated command or commands. In step 679 fan device 1 110 implements the received recovered command or commands, e.g., turns on light 1 of fan device 1 110. In some embodiments, fan device 1 110 in step 680 generates and sends acknowledgment signal 681 to server 108, which is received in step 682. Some embodiments include step 683, in which the control server 108 updates fan device 1 state information based on the commands in transmitted signal 670 and the reception of acknowledgment signal 681, in response to receiving the acknowledgment signal 681 in step 682. In step 684, server 108 generates and sends acknowledgment signal 685, which is a forwarded version of acknowledgment signal 681, to WT 1 120. In step 686 WT 1 120 receives acknowledgment signal 685 and has confirmation that the command of signal 662 has been received and/or acted upon.

FIG. 4E illustrates control of fan device 1 110 via a remotely located device, WT 1 120, which may be a cellphone, e.g., a smartphone, which is currently located outside the customer premises 1 102, which sends a control signal through the control server 108 for delivery to fan device 1 110. For example, WT 1 120 is a smartphone that connects to the Internet 106 via a cellular signal and sends the command over the cellular channel to the control server 108 via the Internet 106. In the case where the control signal passes through the control server 108, the fan device 110 being controlled may not send back a message reporting implementation of the communicated command and the server 108 can update the state information based on the knowledge that the fan device 1 110 was instructed to perform the operation and/or optionally, an acknowledgment from the fan device 1 110 indicating that the control message was received and/or acted up.

Figure 5:
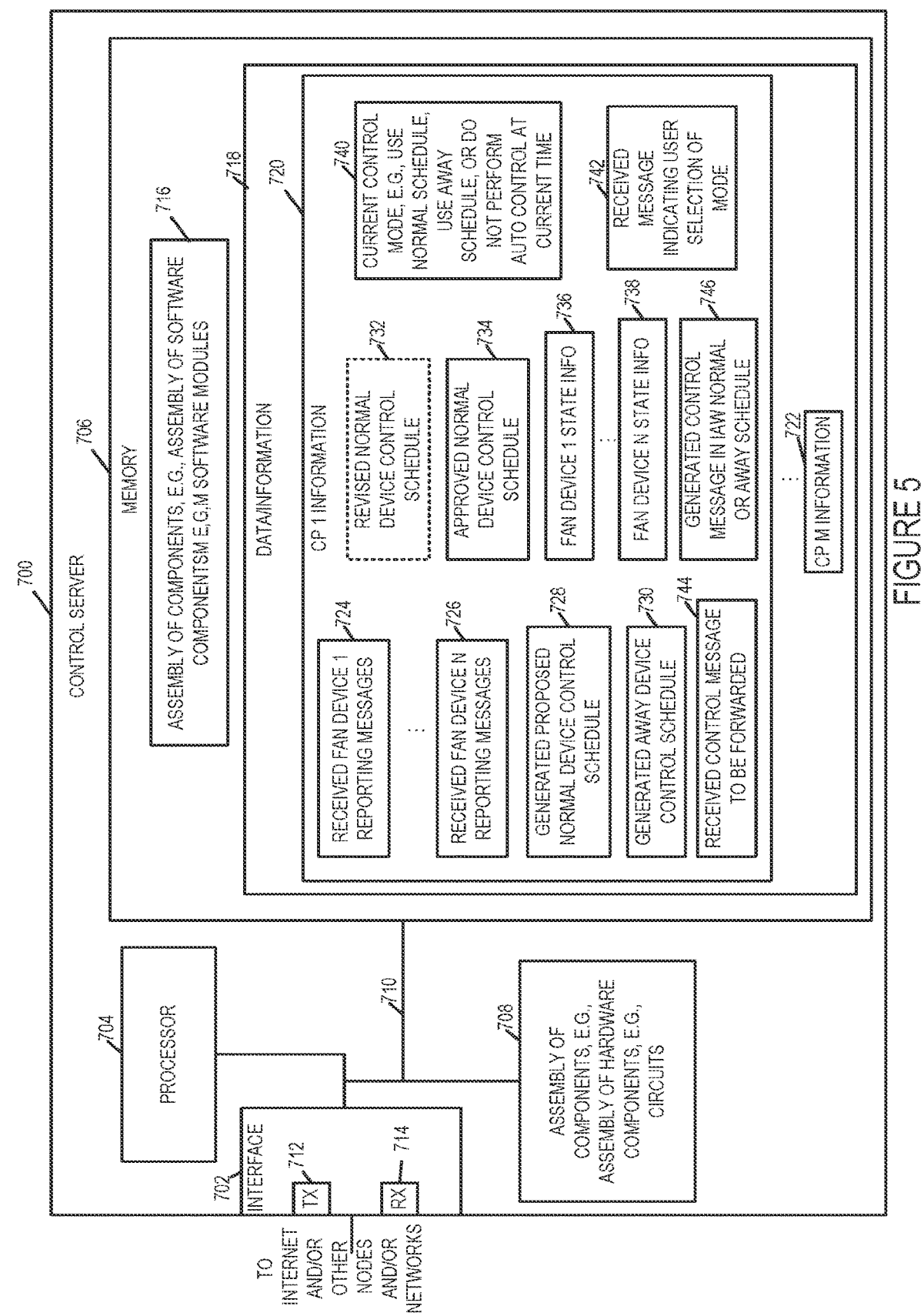
FIG. 5 is a drawing of an exemplary control server in accordance with an exemplary embodiment.

FIG. 5 is a drawing of an exemplary control server 700 in accordance with an exemplary embodiment. Control server 700 is, e.g., control server 108 of FIG. 1 and FIG. 4. Control server 700 includes an interface 702, a processor 704, e.g., a CPU, memory 706, an assembly of components 708, e.g., assembly of hardware components, e.g., assembly of circuits, coupled together via a bus 710 over which the various elements may interchange data and information. Interface 702 includes a receiver 714 and a transmitter 712. Interface 702 couples the control server to the internet and/or other networks and/or devices.

Memory 706 includes an assembly of components 716, e.g., an assembly of software components, e.g., software modules. Data/information 718 includes information corresponding to a plurality of customer premises (customer premises 1 information 720, . . . , customer premises M information 722). Customer premises 1 information 720 includes received fan device 1 reporting messages 724, . . . , received fan device N reporting messages 726, a generated proposed normal device control schedule for CP1 728, and a generated away device control schedule for CP1 730. In some embodiments, CP1 data/information 720 includes a revised normal device control schedule 732, e.g., based on user revisions to the proposed schedule. CP1 information 720 further includes fan device 1 state information 736, fan device N state information 738, a current control mode of operation with regard to controlling the fan devices at CP1 740, e.g., use the approved normal device control schedule, use the away device control schedule, or do not perform automatic control at the current time, a received message 742 indicating user selection of mode, or a user command to switch modes, or user communicated indicator indicating whether or not the user is away which is utilized to determine mode selection. CP 1 information further includes a received control message 744, e.g., from a WT of an authorized user, to be forwarded to a fan device indicated in the received message to control the fan device, and a venerated control message 746 in accordance with (IAW) the normal or away schedule, said generated message to be sent to a fan device at an appropriate time in accordance with the normal or away schedule.

Figure 6:
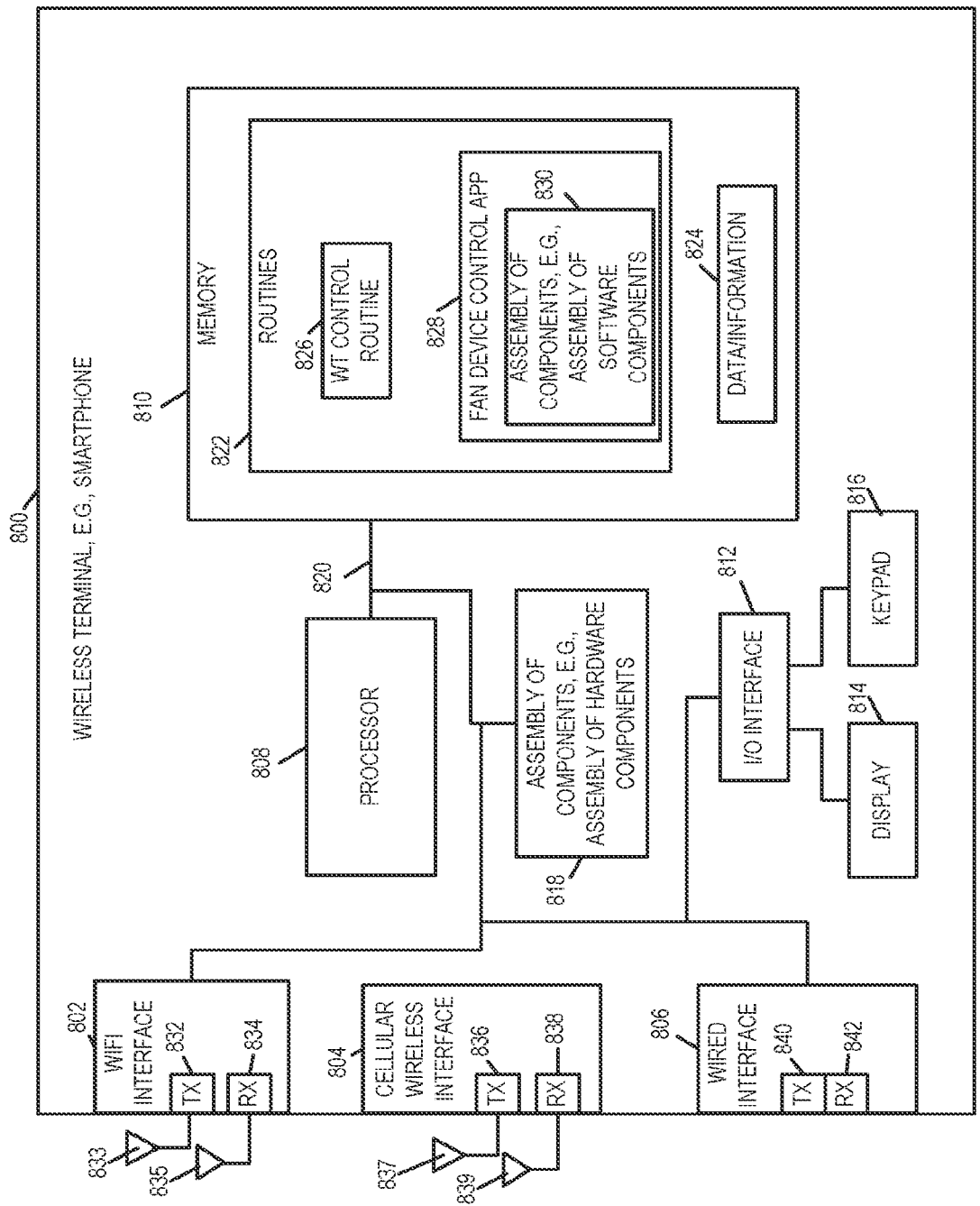
FIG. 6 is a drawing of an exemplary wireless terminal, e.g., a smartphone, in accordance with an exemplary embodiment.

FIG. 6 is a drawing of an exemplary wireless terminal (WT) 800, e.g., a smartphone, in accordance with an exemplary embodiment. Exemplary WT 800 is, e.g., WT 1 120 of FIG. 1 and FIG. 4.

Exemplary WT 800 includes a WiFi interface 802, a cellular wireless interface 804, a wired interface 806, a processor 808, memory 810, an I/O interface 812 coupled to display 814, e.g., a touchscreen display, keypad 816, and an assembly of components 818, e.g., an assembly of hardware components 818, e.g., an assembly of circuits. The various elements 802, 804, 806, 808, 810, 812, 818 are coupled together via a bus 820 over which the various elements may interchange data and information.

WiFi interface 802 includes a WiFi transmitter 832 and a WiFi receiver 834 coupled to antennas (833, 835), respectively, via which the WT 800 may transmit and receive WiFi signals. Cellular wireless interface 804 includes a wireless transmitter 836 and a wireless receiver 838 coupled to antennas (837, 839), respectively, via which the WT 800 may transmit and receive wireless cellular signals. In some embodiments, the same antenna is used for one or more transmitters and/or receivers. Wired interface 806 includes network transmitter 840 and a network receiver 842 via which the WT 800 may transmit and receive signals, via a wired connection to the Internet and/or to other nodes.

Memory 810 includes routines 822 and data/information 824. Routines 822 includes a wireless terminal control routine 826, and a fan device control application 828. Fan device control application 828 includes an assembly of components 830, e.g., an assembly of software components, for performing different functions related to fan device control, fan device status monitoring, setup and initialization, user authorization, communications with a fan device, communications with a control server, user interfaces, etc. Fan device control application 828 controls WT 800 to present one or more custom interfaces to the user of WT 800, e.g., via smartphone display 814, which allows the user to control fan devices. In some embodiments, one exemplary control display simulates the input of control panel 204 of wall control unit 202, e.g., accepting inputs for: an on/off fan power transition command, a fan reverse command, a fan speed increase command, a fan speed decrease command, an on/off light power transition command, a light output increase command, and a light output decrease command. In some embodiments, one exemplary control display is configured to accept inputs for the following commands: a fan on command, a fan off command, a light on command, a light off command, a fan reverse command, a fan direction selection input command, a fan speed level setting command, a light intensity level setting command, a fan speed increase command, a fan speed decrease command, a light intensity increase command, a light intensity decrease command, a light intensity change rate command, e.g., allowing a smooth gradual light intensity specified change over a specified time period, and a fan speed change rate command, e.g., allowing a smooth gradual fan speed level change over a specified time period. In various embodiments, the fan device control application 828 receives user command inputs, generates control messages and sends the control messages to either the fan device, e.g., via WiFi signaling, or to a control server for forwarding to the fan device to be controlled, e.g., depending on the location of the WT 800. Fan device control app 828 is further configured to operate WT 800 to: receive a proposed normal device control schedule from a control server, present the received proposed schedule to a user, receive user approval of the schedule, receive user revisions, generate a revised schedule incorporating the revisions, and generate and send an approval message or a revised schedule to the control server. Fan device control app 828 is further configured to operate the WT 800 to: receive user input indicating that a user desires that one or more fan devices be controlled in accordance with the normal approved device control schedule, the away schedule, or manually via WT 800 input and/or a wall control panel, e.g., for a specified period of time, and communicate the user input to the control server, e.g., to control switching between normal schedule automatic device control, away schedule automatic device control, and no automatic control. In some embodiments, the application 828 generates and sends indicators, e.g., an away indicator or a home indicator, e.g., based on user input, to control switching between normal and away device control schedules. Fan device control app 828 is further configured to control WT 800 to send a request for fan device status, e.g. fan device state information such as on/off status of a fan, on/off status of a light, light intensity output level, fan direction, and fan speed, to a fan device and/or to the control server, to receive fan device status information, and to present the received fan device status information to a user of WT 800, e.g., on display 814. In some embodiments, current fan device status information is presented concurrently with an input control interface on the display, e.g., on the smartphone screen display.

Figure 7A:
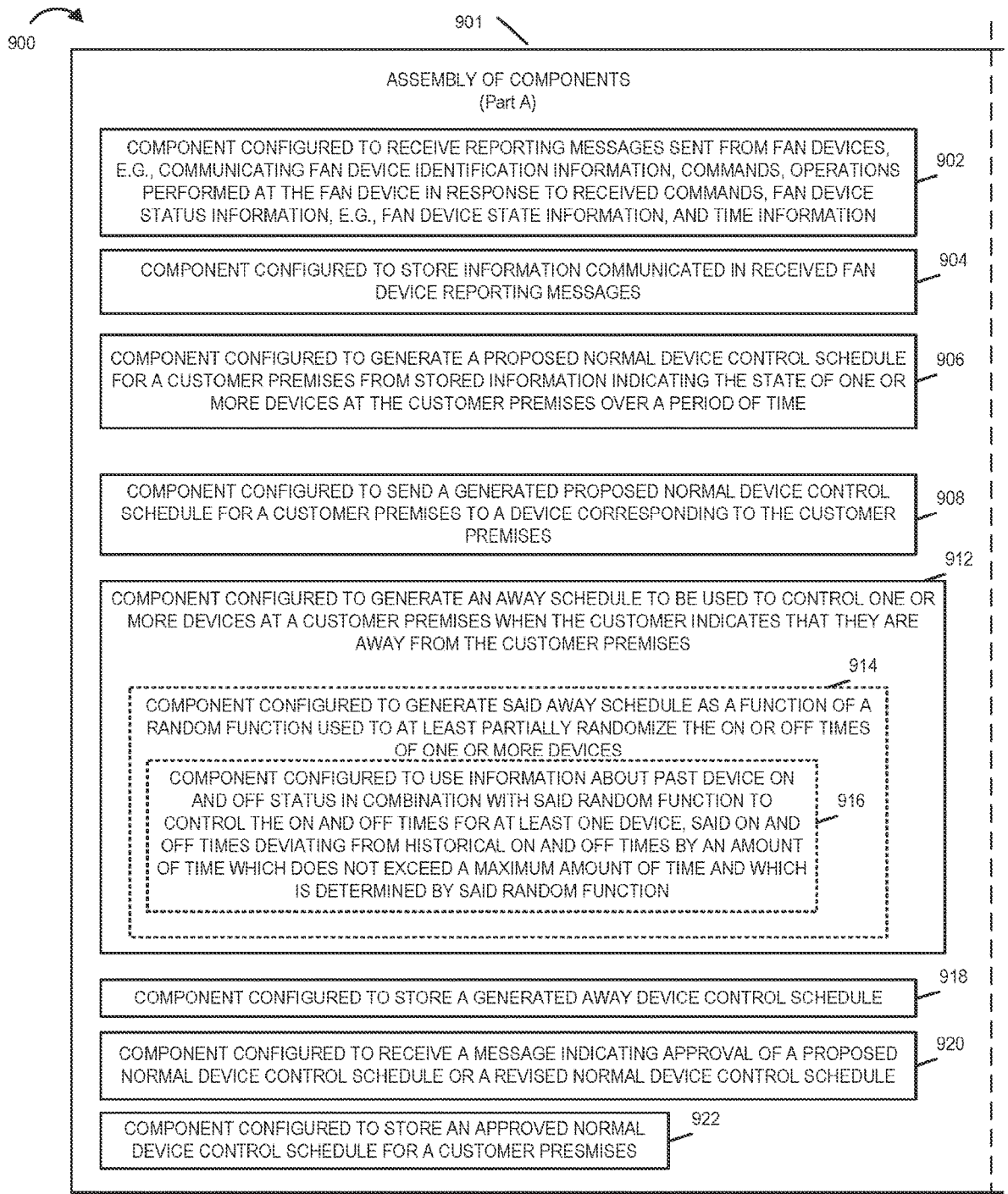
FIG. 7A is a first part of an exemplary assembly of components which may be included in an exemplary control server in accordance with an exemplary embodiment.

FIG. 7, comprising the combination of FIG. 7A and FIG. 7B, is a drawing of an assembly of components 900, comprising Part A 901 and Part B 903, which may be included in an exemplary control server, e.g., control server 108 of FIG. 1 and FIG. 4 or control server 700 of FIG. 5 in accordance with an exemplary embodiment.

Assembly of components 900 may be included in an exemplary server, e.g., control server 700. The components in the assembly of components 900 can, and in some embodiments are, implemented fully in hardware within a processor, e.g., processor 704, e.g., as individual circuits. The components in the assembly of components 900 can, and in some embodiments are, implemented fully in hardware within the assembly of hardware components 708, e.g., as individual circuits corresponding to the different components. In other embodiments some of the components are implemented, e.g., as circuits, within processor 704 with other components being implemented, e.g., as circuits within assembly of components 708, external to and coupled to the processor 704. As should be appreciated the level of integration of components on the processor and/or with some components being external to the processor may be one of design choice. Alternatively, rather than being implemented as circuits, all or some of the components may be implemented in software and stored in the memory 706 of the server 700, with the components controlling operation of server 700 to implement the functions corresponding to the components when the components are executed by a processor e.g., processor 704. In some such embodiments, the assembly of components 900 is included in the memory 706 as assembly of software components 716. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 704, configure the processor to implement the function corresponding to the component. In embodiments where the assembly of components 900 is stored in the memory 706, the memory 706 is a computer program product comprising a computer readable medium comprising code, e.g., individual code for each component, for causing at least one computer, e.g., processor 704, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the server 700 or elements therein such as the processor 704, to perform the functions of various steps in an exemplary method illustrated and/or described with respect to the signaling diagram 400 of FIG. 4 and/or described with respect to any of the Figures or text including the lists of exemplary embodiments. Thus the assembly of components 900 includes various components that perform functions of corresponding one or more described and/or illustrated steps of an exemplary method, e.g., one or more steps of the method of FIG. 4.

Assembly of components 900 includes a component 902 configured to receive reporting messages sent from fan devices, e.g., communicating fan device identification information, customer premises identification information, commands received at the fan device, operations performed at the fan device in response to received commands, fan device status information, e.g., fan device state information, e.g., fan on or fan off, fan speed, fan direction, light on or off, light intensity level, etc., and time information, e.g., time a command was received at the fan device, time an operation was performed in response to a received command, time information corresponding to state information included in the reporting message, and/or transmission time corresponding to reporting message. In some embodiments, a reporting message may, and sometimes does include aggregated information corresponding to multiple commands. Assembly of components further includes a component 904 configured to store information communicated in received reporting messages from the fan devices. In some embodiments, as part of receiving a reporting message the message reception time is also recorded and stored.

Assembly of components 900 further includes a component 906 configured to generate a proposed normal device control schedule from stored information indicating the state of one or more devices at a customer premises over a period of time, e.g., over two or more weeks, a component 908 configured to send a generated proposed normal device control schedule for a customer premises to device corresponding to the customer premises, and a component 912 configured to venerate an away schedule to be used to control one or more devices at a customer premises when the customer indicates that they are away from the customer premises. In some embodiments, component 912 includes a component 914 configured to generate said away schedule as a function of a random function used to at least partially randomize the on or off times of one or more devices. In some embodiments, component 914 includes a component 916 configured to use the information about past device on and off status in combination with said random function to control the on and off times for at least one device, said on and off times deviating from historical on and off times by an amount of time which does not exceed a maximum amount of time, e.g., 30 minutes, and which is determined by the random function. Assembly of components 900 further includes a component 918 configured to store a generated away device control schedule corresponding to a customer premises, a component 920 configured to receive a message indicating approval of a proposed normal device control schedule or a revised normal device control schedule, and a component 922 configured to store an approved normal device control schedule for a customer premises, said approved schedule being either the proposed normal device control schedule or the received revised normal device control schedule.

Assembly of components 900 further includes a component 924 configured to control one or more devices at a customer premises based on the stored approved normal device control schedule corresponding to the customer premises. Component 924 includes a component 926 configured to identify and send a command to a fan device at the customer premises via the internet and a WiFi router to control the fan device based on the normal approved device control schedule. Assembly of components 900 further includes a component 928 configured to control one or more devices at a customer premises based on the stored away device control schedule corresponding to the customer premises. Component 928 includes a component 930 configured to identify and send a command to a fan device at the customer premises via the internet and a WiFi router to control the fan device based on the away device control schedule.

Assembly of components 900 further includes a component 932 configured to update information about the state of a fan device at a customer premises based on a command communicated to the fan device in accordance with an approved normal device control schedule or an away device control schedule, a component 934 configured to update information about the state of a fan device at a customer premises based on a command, e.g., a received command from a user device of an authorized user who is currently located outside the customer premises, said command being forwarded to the fan device by the control server acting as a relay device. Assembly of components 900 further includes a component 936 configured to receive a signal from a user indicating an away status corresponding to a customer premises and a component 938 configured to switch from using a stored normal device control schedule to using a stored away device control schedule based on a received away status indicator.

Figure 8:
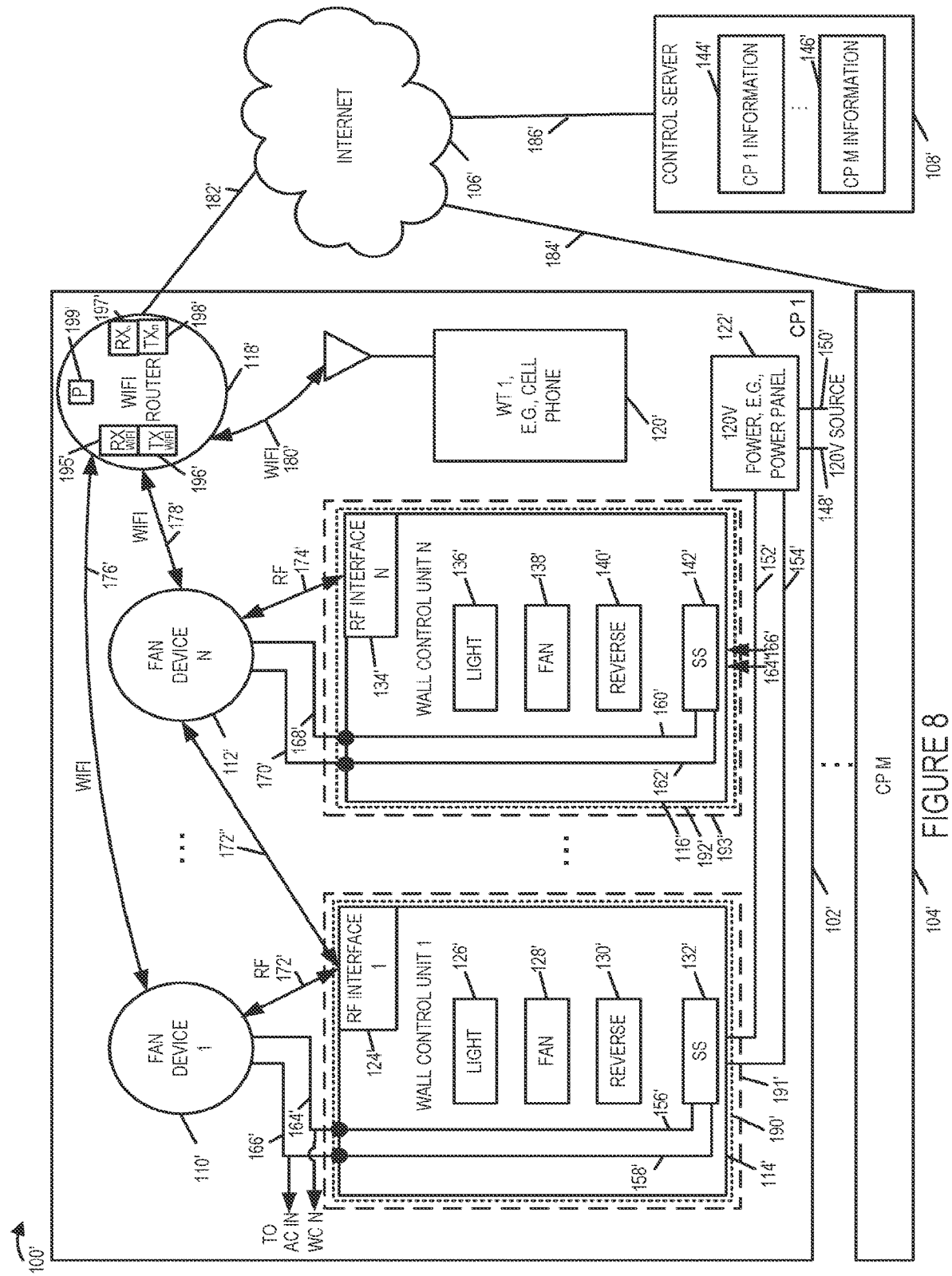
FIG. 8 is a drawing of an exemplary system including, controllable fan devices, wall control units, a wireless terminal, a WiFi router and a control server in accordance with another exemplary embodiment.

FIG. 8 is a drawing of an exemplary system 100' including controllable fan devices (110', . . . , 112'), wall control units (114', . . . , 116'), a wireless terminal 120', a WiFi router 118' and a control server 108' in accordance with another exemplary embodiment. System 100' of FIG. 8 is similar to system 100 of FIG. 1 and similar components and similar signaling have been indicated using an apostrophe, e.g., fan device 1 110' of FIG. 8 is similar to fan device 1 110 of FIG. 1. There are several differences between the system 100 of FIG. 1 and system 100' of system 8.

Wall control unit 1 114' of system 100' of FIG. 8 controls multiple fan devices (fan device 1 110' and fan device N 112'), provided power is available to those fan devices. This may be observed by RF control signaling 172' going from RF interface 1 124' to fan device 1 110' and RF control signaling 172" going from RF interface 1 124' to fan device N 112'. Wall control unit N 116' can only control fan device N 112', as shown by RF signal 174' going from RF interface N 134' to fan device N. In comparison, in system 100 of FIG. 1, wall control unit 1 114 controls fan device 1 110, and wall control unit N 116 controls fan device N 112.

In system 100 of FIG. 1, input power to each wall control unit (114, 116) is sourced from the same source (lines 152, 154). Safety switch 132 can be used to cut off power to fan device 1 110. Safety switch 142 can be used to cutoff power to fan device N 112.

In contrast, in system 100' of FIG. 8, input AC power to wall control unit N 116' is sourced from the AC output of wall control unit 1 (lines 164', 166'). Thus in the system 100' of FIG. 8, the safety switch 132' of wall control unit 1 114' can be used to cut power to fan device 1 110' and fan device N 112', and then turn input power on and reinitialize the system. This approach is useful to allow wall control unit 1 114' to reinitialize both fan devices and synchronize their operation so that control commands sent via RF signals from RF interface 124' of wall control unit 1 114 will affect both fan device 1 110' and fan device N 112' in the same manner.

In addition, in system 100' of FIG. 8, safety switch (SS) 142' can be used to cut off power to just fan device N 112'.

In one exemplary embodiment N=6, and wall control unit 1 114' can, and sometimes does, control 6 fan devices (fan device 1 110', fan device 2, fan device 3, fan device 4, fan device 5, fan device 6 112') to turn on their fans, at the same time, via a command, e.g., a command communicated in an RF control signal sent from wall control unit 1 114'. In some such embodiments, all 6 fans are being powered from the same AC line, e.g., the same 20 A AC input power line. In some such embodiments, the 6 fans, e.g., Brushless DC motor fans, do not include an optical encoder, magnetic encoder, e.g., resolver or synchro, or Hall effect sensor. In various embodiments, (fan device 1 110', fan device 2, fan device 3, fan device 4, fan device 5, fan device 6 112'), which can be, and sometimes are, turned on concurrently while on the same input power line, each include an exemplary AC power interface including: a varistor, a common mode choke, an X capacitor, and two Y capacitors. In some embodiments, the AC power interface of each fan device includes a multi-layer board, e.g., a 4 layer circuit board, in which one copper layer is connected to earth ground. In some embodiments, the 6 fan devices may, and sometimes do, include one or more 10 ft ceiling fans. In some embodiments, each of the 6 fan devices includes a 10 ft ceiling fan.

In another embodiment, N=10, and wall control unit 1 114' can, and sometimes does, control 10 fan devices (fan device 1 110', . . . , fan device 10 112') to turn on their fans, at the same time, via a command, e.g., a command communicated in an RF control signal sent from wall control unit 1 114, In some such embodiments, all 10 fans are being powered from the same AC line, e.g., the same 20 A AC input power line. In some such embodiments, the 10 fans, e.g., Brushless DC motor fans, do not include an optical encoder, magnetic encoder, e.g., resolver or synchro, or Hall effect sensor. In some embodiments, the 10 fan devices may, and sometimes do, include one or more 10 ft ceiling fans. In some embodiments, each of the 10 fan devices includes a 10 ft ceiling fan.

Figure 9:
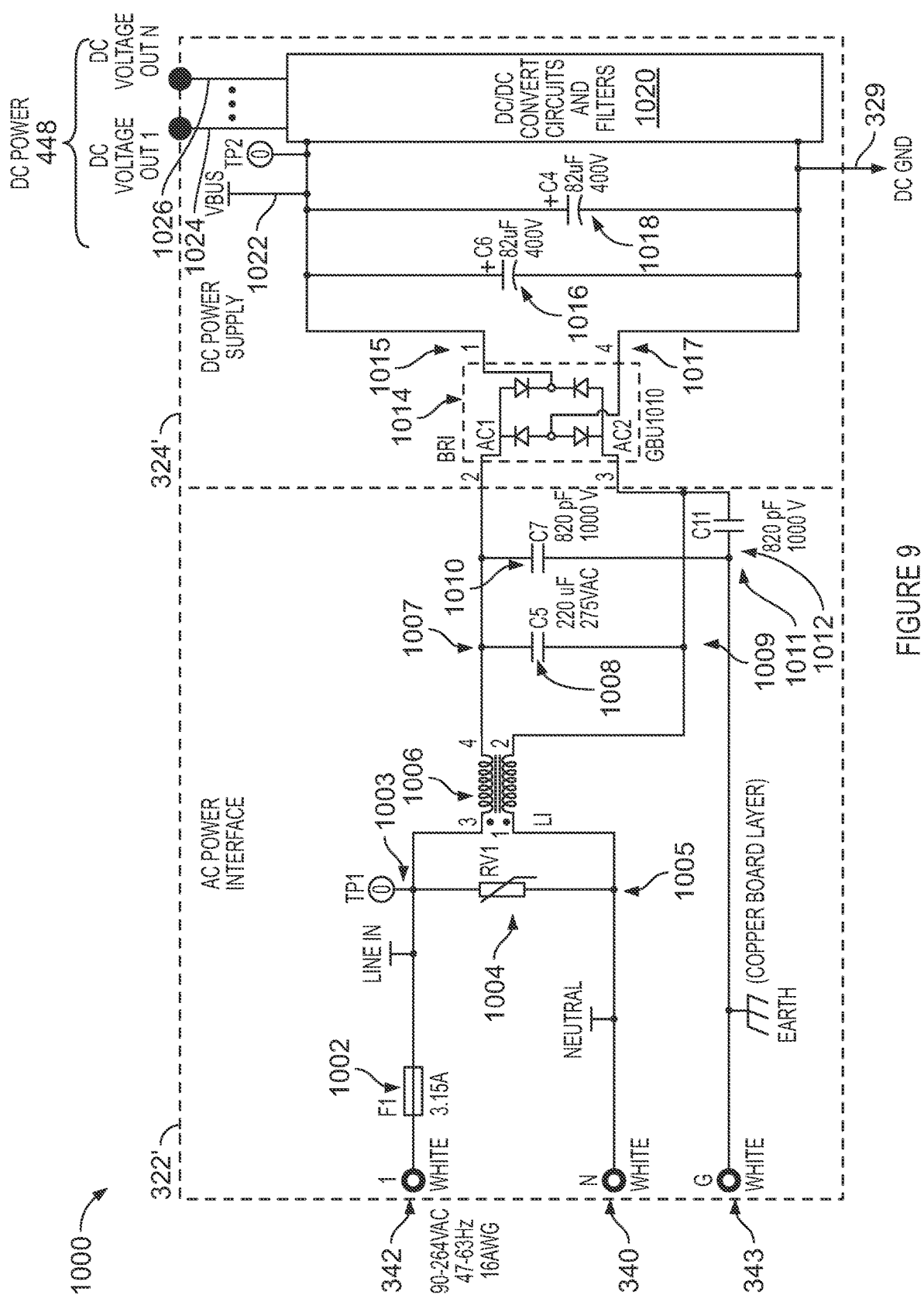
FIG. 9 is a drawing of an exemplary AC power interface coupled to an exemplary DC power supply which may be used in the fan device of FIG. 3 in accordance with an exemplary embodiment.

FIG. 9 is a drawing 1000 of an exemplary AC power interface 322' coupled to an exemplary DC power supply 324' which may be used in the fan device 300 of FIG. 3 in accordance with an exemplary embodiment. In some embodiments, AC power interface 322' is AC power interface 322 of fan device 300 of FIG. 3, and DC power supply 324' is DC power supply 324 of fan device 300 of FIG. 3.

AC power, e.g., 90-264 VAC 47-63 Hz input via 16AWG wires, is input via L terminal 342, and N (Neutral) terminal 340, and G terminal 343 is connected to earth ground. The line connected to L terminal is referred to a Line IN and Line IN is fused, with fuse F1 1002, e.g., a 3.15 A fuse. After the fuse F1 1002, there are several components, varistor RV1 1004, common mode choke L1 1006, and capacitors C5 1008, C7 1010 and C11 1012, which contribute to the AC filtering, and produce a filtered AC.

Varistor RV1 1004 is, e.g., a 510V 2.5 KA DISC 10 MM varistor, suppresses voltage spikes. Common mode choke L1 1006, e.g., a 15 MH 1 A 2LN TH common mode choke, plays an important role in the system in that it that actually helps with line noise entering and exiting the fan device 300, which includes receivers. Line noise is coupled within the choke 1006 to remove the noise from the AC line.

Capacitors C5 1008, C7 1010, and C11 1012 suppress high frequency noise. Capacitor C5 1008, which is a X capacitor, shunts the high frequency noise across the input AC lines (L 1007, N 1009), Capacitor C7 1010, which is a Y capacitor, shunts the high frequency noise on the AC L line 1007 to earth ground 1011. Capacitor C11 1012, which is a Y capacitor, shunts the high frequency noise on the AC N line 1009 to earth ground 1011. In one exemplary embodiment, C5 1008, C7 1010, and C11 1012 are 0.22 UF 20% 760 RAD capacitors. In another embodiment, C5 is a 220 micro Farad 275 VAC capacitor; C7 is a 820 pF 1000V capacitor and C11 is a 820 pF 1000V capacitor.

DC power supply 324' includes full bridge rectifier BR1 1014, capacitors C6 1016, C4 1018, and DC/DC converter circuits and filters 1020, which are coupled together as shown in FIG. 9. In one embodiment, capacitor C6 1016 and capacitor C4 1018, which are across the outputs (1015, 1017) of BR1 1014, are each 82 micro Farad 400V electrolytic capacitors. BR1 1014, is a Full bridge rectifier BR1 1014, e.g., a GPP 10 A 1000V GBU rectifier bridge, takes the filtered AC from lines (1007, 1009) and makes a DC BUS, V BUS 1022, with respect to DC ground 329, across its outputs 1015, 1017. In one exemplary embodiment, the DC Bus 1022 voltage is approximately 170 VDC with respect to DC ground 329, in the case of a filtered 120 VAC input to BR1 1014. For example, DC Bus voltage=RMS (AC)*sqrt (2). In some embodiments, the DC Bus 1022 voltage, e.g., 170 VDC, is used directly to provide power to the fan motor. From the DC VBUS voltage, e.g., of approximately 170 VDC, other DC rail voltages are created. DC VBUS voltage 1022 is used as input to DC/DC converter circuits and filters 1022, which generates a plurality of DC output voltages (DC output voltage 1 1024, . . . , DC output voltage N 1026), which are utilized by the fan device 300. In various embodiments, the generated plurality of DC output voltages includes a 16 VDC supply and a 3.3 VDC supply. In various embodiments, basic filtering is implemented, e.g., including decoupling and bypass capacitors, before and after each supply.

In various embodiments, the exemplary AC power interface 322' coupled to an exemplary DC power supply 324' of FIG. 9 does not include a Negative Temperature Coefficient (NTC) InRush Protection device.

In some embodiments, fan device 300 including the AC power interface 322' and DC power interface 324', uses a four layer board and the AC power interface section 322' has an internal layer, e.g., a copper internal layer, referenced to earth ground. Having an adjacent copper layer like this, which is reference to earth ground, also helps to couple noise out of the system.

Various aspects and/or features of some, but not necessarily all, embodiments, are further discussed below.

Various embodiments are directed to use of an RF and WiFi control in a fan device, e.g., fan device 300, to control fan 303 status and speed and/or fan light 306 on/off status and intensity. The fan device 300 includes both an RF interface 314 and a WiFi interface 312. The customer premises, e.g., customer premises 1 102, includes a WiFi router 118 through which WiFi communications can be sent from a WiFi capable device, e.g., a cell phone 120, to control the fan device 300 and its various functions. While Win control is via a WiFi router 118 in the home 7 the control signals normally do not traverse the Internet 106 or another external network. Accordingly, WiFi control is possible without the need for a connection to an external network or server 108. In addition to WiFi control, control of the fan device 300 can be via an RF control device 200, e.g., a wall mounted controller. In some embodiments 120V power is supplied to the fan device 300 via the wall mounted controller 202. While 120V power may be supplied via the wall controller 202, control signals from the wall mounted controller 202 are transmitted using RF signals to the RF interface 314 of the fan device 300. The RF interface 314 uses a different frequency band than the frequency band used for WiFi signals sent to/from the WiFi router 118. In some embodiments the RF interface 314 uses an unlicensed frequency spectrum which is different than that used for WiFi signals.

Since the RF and WiFi control signals need not pass over an external communications network as in the case of systems where commands must first be sent to a network server outside a customer premises, e.g., CP1 102, and then sent from the network server to the device to be controlled, the fan device 300 can be controlled either by the wall controller 202 or a WiFi device even if a connection to the Internet or another external network is not available.

In some, but not necessarily all embodiments, the fan device 300 reports its state and/or changes in state due to received commands to a server, e.g., control server 108, e.g., located outside the customer premises 102. The communication with the external server 108 may be, and sometimes is, via a WiFi router 118 and Internet 106 connection. The server 108 logs the state information of one or more devices, e.g., fan device 1 110 and fan device N 112, at each customer premises it is associated with. The server 108 generates, automatically, a recommended normal schedule based on historical device state information including device on/off times, fan speed information and/or light intensity information. Machine learning and historical device state information may be, and sometimes is, used for generating the recommended schedule for a customer premises. The recommend normal control schedule is communicated to an individual, e.g., a customer at the customer premises to which the schedule relates. The communication of the proposed schedule may be, and sometimes is, from the server 108 via the Internet 106 and WiFi router 118 at the customer premises, e.g., CP 1 102, to which the schedule relates. The customer can approve the recommended schedule and/or provide a revised normal schedule to be used by the server 108 to control devices at the customer premises.

In addition to generating a normal control schedule for a customer premises, an away schedule to be used when a customer indicates that the customer premises is in an away state is generated. An away state corresponds to when the normal occupants of the customer premises are away from the customer premises. The away schedule is generated based on a random function so that devices, e.g. fan device 1 110, . . . , fan device N 112, will be turned on at somewhat randomized times making it difficult for a potential burglar to determine whether the devices are being controlled by an automated system or by a human present at the premises, e.g., CP 1 102. In some embodiments historical device use information is taken into consideration when the server, e.g., control server 108, automatically generates the away schedule with the on/off times being somewhat random but remaining within a reasonable time, e.g., 30 minutes or an hour, of when the devices are turned on and off when a human is present.

While a user can control the devices, e.g., a fan device 300, while in the home via the RF controller 202 or a WiFi controller, e.g., including in WT 1 120, without having to send commands outside the home, remote control of devices, e.g., fan devices, is also supported. A user can login to the control server 108 and once authenticated is allowed to send control commands to devices, e.g., fan devices 110, 112 at the home via the control server 108 and the WiFi router 118. In this way a user can control devices, e.g., fan devices 110, 112, while away from the home. In the case of commands sent via the server 108, the server 108 can, and sometimes does, update device state information based on the commands sent from the server 108 to the device, e.g., device 110, to be controlled thereby eliminating the need for the device, e.g., device 110 to report a state change to the server 108. While in some embodiments devices, e.g., fan devices 110, 112, do not report state changes to the server 108 which are in response to commands communicated by the server 108 to the device, e.g., fan device 110, being controlled, in other embodiments the devices being controlled, e.g., fan devices 110, 112, routinely report a state change to the control server 108 regardless of whether the command was from the server 108, wall controller 202 or WiFi device, e.g., WT 120, in the home.

The customer to which a home corresponds can enable/disable use of a control schedule by the server 108. For example the user can send a signal, e.g., via WT 1 120, to the control server 108 to indicate that the normal device control schedule should be used or the away device control schedule should be used or that no control schedule should be used. The signal may indicate automated control is to be set to off for the home, automated control should be set to on for the home, and, when the automated control is on whether an away state is indicated indicating that the away schedule should be used or that the premises is in a normal state and thus the normal schedule should be used.

In various embodiments a controller, e.g., wall control unit 202, with an RF interface 208 is used to control a fan device, e.g., fan device 300, which includes a fan motor 304 and may also include a lighting device, e.g., light 306. The controller 202 in some embodiments is in the form of a wall control module which may be, and sometime is, mounted in a standard electrical wall box, e.g., box 190, in a room in which the fan device, e.g., fan device 300, to be controlled is located. To simplify installation and avoid the need for more than the normal 120 v power line used to power an outlet of light, from a 120V AC prospective the controller 202 acts as a simple pass through device through which AC power is supplied to the fan device unit 300. As a safety, the controller 202 includes an AC disconnect 206 which can be used to cut all power to the fan device unit 300. The disconnect switch 206 may be in the form of a push or pull switch or a pull tab which can interrupt the power to the fan device 300.

Control of the fan device 300 is via an RF interface 208 included in the wall controller 202 in some embodiments activation of the safety disconnect switch 206 will cut power to the RF interface 208 of the wall controller 202 in addition to power to the fan device 300. In this way, in some but not necessarily all embodiments, the safety cut off 206 serves as a physical kill switch integrated into the wall controller 202 for both the wall controller 202 and the fan device 300.

The controller 202 includes inputs (216, 214, 224, 226, 220, 222, 218) for controlling fan on/off operations, light on/off operations, fan speed, e.g., up/down, and/or light intensity, fan device light output up/down, and fan direction. In some embodiments light output and fan speed can be smoothly controlled, e.g., with light intensity being controlled in a smooth fashion over a wide range of intensity value as opposed to simply a few discrete output levels. The wall controller 202 transmits RF control signals to implement or communicate commands that are generated based on the pressing or altering of the control inputs (214, 216, 218, 220, 222, 224, 226) on the wall controller 202. The control signals are transmitted to the fan device 300 using a RF frequency band which is different from that used for WiFi signals at the customer premises where the controller 202 is located.

In some embodiments, the wireless terminal 120 is not a mobile device but is instead a wall mounted device which is mounted in the customer premises in which one or more fan devices, e.g., fan devices 1 110, . . . , fan device N 112 are located. The wall mounted wireless terminal, may, and in some embodiments does, include a touch screen display upon which menus are presented to a user through which the user can select options to control the operation of one or more functions of the fan devices located at the customer premises, such as the light intensity, fan speed, fan direction, light on/off, fan on/off for one or more of the fans located at the customer premises.

Figure 10:
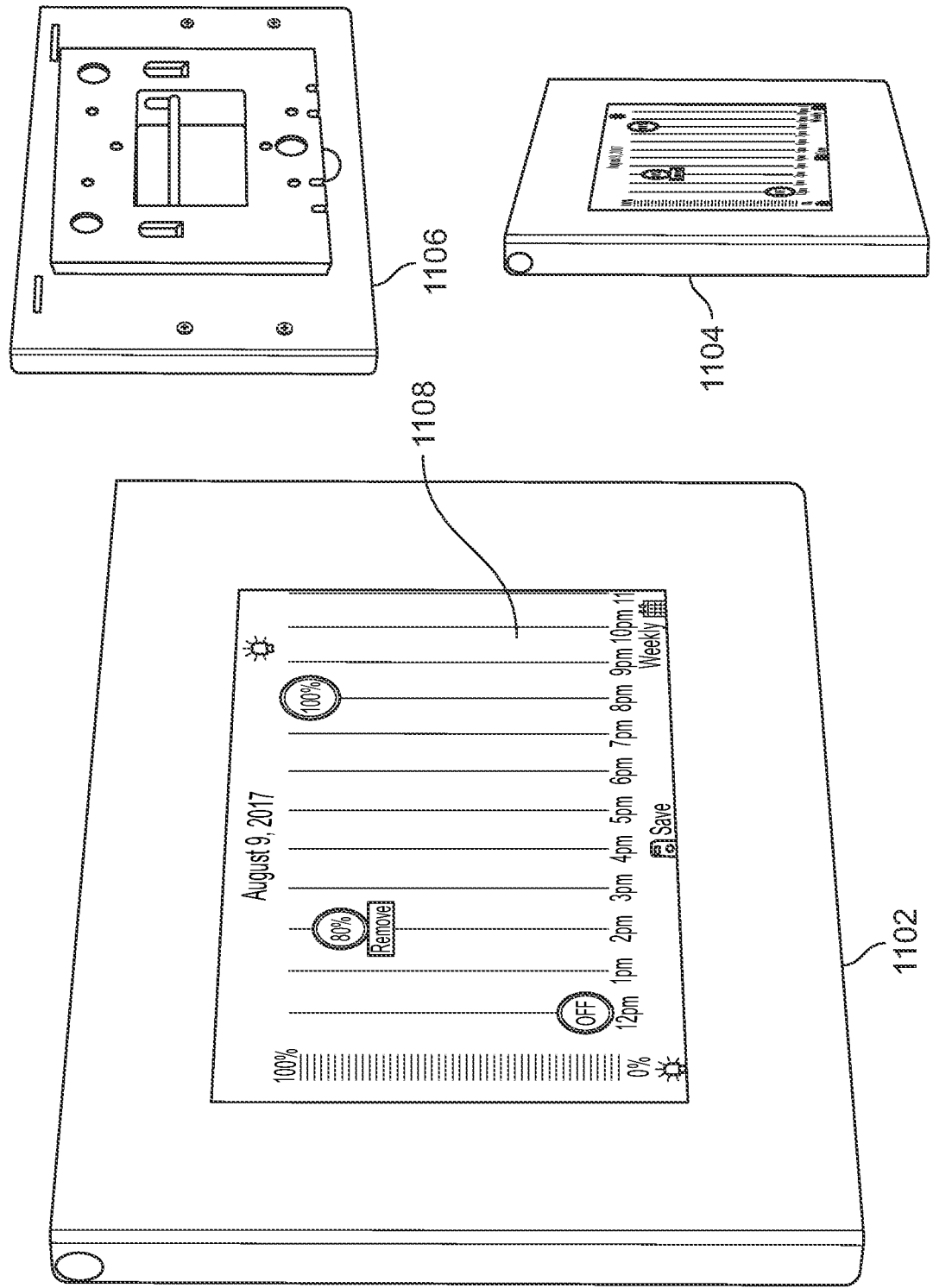
FIG. 10 illustrates an exemplary wall mounted wireless terminal with RF and Wi-Fi interfaces in accordance with an exemplary embodiment of the present invention.

FIG. 10 illustrates several different perspective views of an exemplary wall mounted wireless terminal in accordance with an embodiment of the present invention. Illustrated in FIG. 10 is a first perspective view 1102 of a wall mounted wireless terminal showing its touchscreen 1108 and an exemplary user menu. The second perspective view 1104 of the wall mounted wireless terminal shows an angled side view of the wall mounted wireless terminal. The third perspective 1106 shows a view of the hack of the wireless wall mounted terminal.

Figure 11:
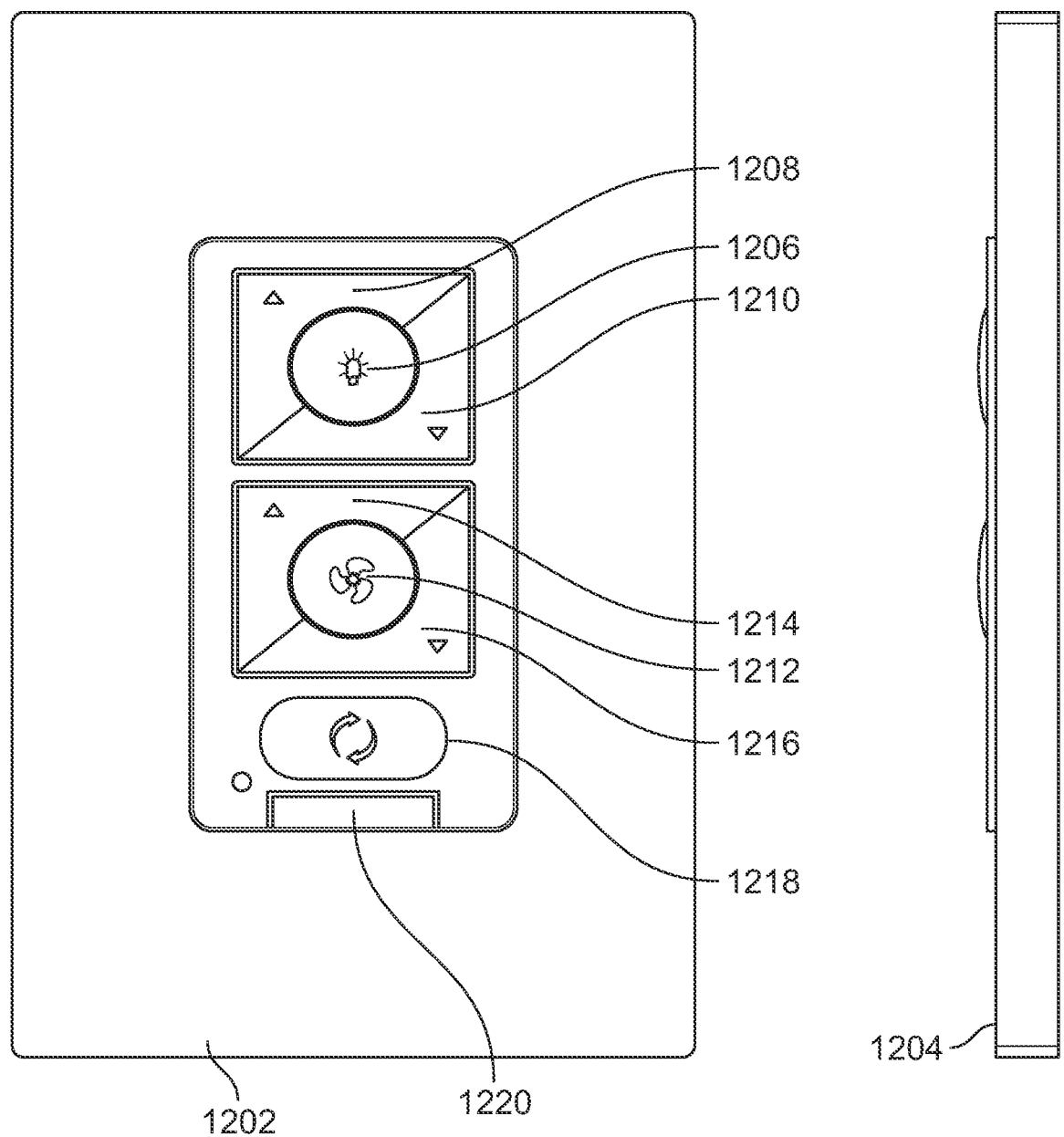
FIG. 11 illustrates an exemplary wall control unit including a safety switch in accordance with an exemplary embodiment of the present invention.

FIG. 11 illustrates an exemplary wall control unit with a safety switch in accordance with an exemplary embodiment of the present invention. FIG. 11 illustrates a front perspective view of an exemplary wall control unit 1202 with a safety switch in accordance with an exemplary embodiment of the present invention and a side view 1204 of the same exemplary wall control unit. The wall control unit 1202 includes a light control on/off button 1206, a light up (increase light intensity) button 1208 and a light down (decrease light intensity) button 1210, a fan on/off button 1212, a fan increase speed button 1214, a fan decrease speed button 1216, a fan reverse direction button 1218 and a mechanical emergency/safety cut off switch 1220.

In some embodiments, a full calendar year (e.g., 365 day) scheduler application in the control server allows a user to store settings, instructions and commands for the operation of one or more of a set of fans devices included on a customer premises with the fan devices then being automatically controlled by the control server in accordance with the user inputted settings, e.g., timing as to when to turn on and off the fan, turn on and off the light, set direction of the rotation of the fan blades, setting of the light intensity, setting of the fan speed, etc.

In some embodiments as previously discussed, the control server includes software instructions which when executed by a processor of the control server operate the control server to generate a recommended customer fan device schedule for an upcoming time period, e.g., one or more days, one or more weeks, or one or months, for controlling the operation of one or more functions or events, e.g., light on/off, light intensity, fan on/off, fan speed, fan direction, for one or more fan devices located at a customer premises based on historical fan device state information gathered over a time frame, e.g., a plurality of days, weeks, or months. The generated recommended customer fan device schedule, e.g., a weekly schedule of fan device events, is then transmitted by the control server to the fan device via the Internet. The fan device receives and stores the generated customer fan device schedule on its memory. A copy of the fan device recommended schedule also being retained in the memory of the control server. A user may then access the local copy of the recommended fan device schedule, e.g., the weekly fan device event schedule, residing in the fan device from a wireless terminal via WiFi and determine whether to accept or modify the recommended schedule. To the extent that the user modifies the recommended schedule the modifications to the schedule are transmitted from the fan device to the control server to update the weekly schedule for the fan device in the control server. The processor of the fan device will then automatically operate the fan device to perform the functions/events on the weekly schedule which have been approved by the user, that is if the user opt in to the recommended schedule. The fan device functions/events perform include for example, turning the fan on on a specific day at a specific time, turning off the fan on a specific day at a specific tune, turning on the lights on specific days at specific times, setting the light intensity to a specific level when the light is turned on, setting the fan speed and direction when the fan is turned on, or turning off the light on a specific day at a specific time. A user may also decide to not opt in to the recommended schedule or to modify the schedule but to instead leave the fan device in a manual mode of operation for certain days of the week or the whole week. Storing a weekly schedule of fan device events on the device that may be automatically executed by the fan device if chosen by a user to operate in an automatic mode of operation provides the benefit that if the WIFI router or Internet connection to the control server becomes disabled the processor of the fan device can still operate the fan device in accordance with the automated weekly schedule as selected or programmed by the user whereas if the control server is the only device to maintain the weekly schedule then when the connection between the control server and the fan device is interrupted or fails the processor of the fan device will not properly operate the fan device in accordance with the user approved weekly schedule.

A few exemplary embodiments of how the control server identifies patterns of events and uses machine learning to generate recommended schedules will now be discussed.

For example, the control server will be operated to identify patterns of events, e.g., light on, light off, light intensity setting, fan on, fan off, fan speed, fan direction, occurring a specified number of times N within a time frame, where N is an integer number, e.g., 3. The time frame may be, and in some embodiments is, a plurality of consecutive weeks such as for example 3 weeks. Identification of patterns of daily events may be, and in some embodiments are, based on the same event occurring at the same time or approximately the same time (e.g., within a time window such as +/−15 minutes) on a number M of consecutive days to not become intrusive, where M is integer number, e.g., M=3. Weekly events will be identified over the course of the time frame, e.g., three week period. For example, if the fan device is controlled to perform a particular function or event, e.g., the fan of the fan device is turned on at 8 p.m. Tuesday of week one of the time frame, the fan of the fan device is turned on at 8:06 p.m. Tuesday of week two of the time frame, and the fan of the fan device is turned on at 7:54 p.m. on week three of the time frame then the control server after analyzing the historical fan device state data for the 3 week period time frame identifies the function or event as being a pattern, e.g., turning on the fan of the fan device at approximately 8:00 p.m. on Tuesday as the fan devices fan is turned on within a 15 minute window of 8 p.m. each Tuesday, 8 p.m. being the average of the fan turn on time of the three repetitive events identified by the control server. The control server generates a recommendation that the fan for the fan device whose state data was analyzed to determine the event pattern is to be turned on at Tuesday at 8 p.m. The recommendation of time fan turn on of 8 p.m. being the average of the time or the fan turn on event occurrence for the three events identified in the pattern.

In another example, a fan of a fan device is turned on Monday at 8 p.m., Tuesday at 9:00 p.m. and Wednesday at 7 p.m. of the same week, that is on three consecutive days. The control server after analyzing the historical state data for the fan device will identify the turn on of the fan of the fan device on the three consecutive days as a pattern of event fan turn on of the fan device. In the case of identifying a pattern of events for consecutive days, the time window for the same event to occur on consecutive days may be, and in some embodiments is, different than the window for an event occurring on the same day for consecutive weeks as discussed in the previous example. In this example instead of a 15 minute window, an exemplary 60 minute window is used. The control server on determining that a pattern of turning on the fan of the fan device on three consecutive days within a 60 minute window has occurred generates a recommendation that the fan of the fan device be turned on at 8 p.m. as an option for a daily schedule. The 8:00 p.m. time of the fan turn on recommendation being generated based on the time of occurrence of the events forming the identified pattern which occurred on the three consecutive days. In this example, the 8:00 p.m. time recommended for fan turn on of the fan device being the average of the 8:00 p.m., 9:00 p.m. and 7:00 p.m. fan turn on event times of the three events in the identified pattern.

In yet another example, the fan of a fan device is turned on every Monday, Wednesday and Friday at 8:00 p.m. The same happens on week two and three of the three week time frame. The control server identifies the fan turn on events as a pattern and generates a recommended schedule based on the pattern of turning on the fan on the days and at the times the fan was turned on. For example, the control server recommends in a weekly schedule to turn on the fan of the fan device on Monday, Wednesday and Friday at 8:00 p.m. in a succeeding week.

In some, but not all, embodiments, the control server waits till the end of the time frame, e.g., 3 weeks, to analyze the fan device historical status information, identify patterns of events and generate a recommended schedule, e.g., a weekly recommended schedule of events for the fan device, based on the identified pattern of events. In some other embodiments, the control server identifies patterns of events on an on-going basis over the time frame, e.g., 3 weeks, as events are occurring using current and historical event status data for the fan device to identify fan device event patterns. The control server can then either generate a recommended schedule on an on-going basis or wait till end of the time frame to generate a recommended schedule. In some embodiments, after the first time frame, e.g., 3 weeks, expires, the control server uses a sliding time frame window to identify new event patterns and generate a new recommended schedule. For example, with the expiration of the first 3 week time frame, the control server identifies fan device event patterns and generates a recommended schedule. With a sliding time frame window of one week, the second time frame will consist of the last two weeks of the first time frame and the first week after the expiration of the first time frame. In this way, the control server will identify event patterns and generate a second recommended schedule at the end of a fourth consecutive week based on the historical event status data for the fan device of the three most recent weeks. In this way, recommended schedules are generated on a weekly basis using the three most recent weeks fan device even status data.

As previously discussed, in most, but not all embodiments, the recommended weekly schedule for each of the fan devices in a customer premises after being generated is transmitted from the control server to the fan device to which the weekly schedule pertains for customer review and/or modification and/or approval. This assumes that the customer has opted into using a weekly schedule to control the operation of the fan device and has selected to review a recommended schedule of fan device events. The automated weekly schedule and the recommended schedule can be cancelled at any time by the user through the input of a cancellation request via a control menu presented on the remote wireless WiFi control device. While the generation of recommended schedules and the operation of an automated schedule of events for a single fan device has been discussed, the control server also generates recommended schedules of events for groups of fan devices. The automated schedules for a time period, e.g., a weekly schedule is also available to automatically control the operation of groups of fans. For example, in a manufacturing facility a group of fans of a set of fan devices may be automatically turned on before the beginning of the work day. E.g., starting up fans of each device of a group of fan devices concurrently at 6:30 p.m. at a particular speed, then turning on the lights at 6:45 p.m. before the workers arrive at 7:00 a.m. and turning off the fans and lights at 8:00 p.m. after the manufacturing facility is closed for the day. Similarly, the automated weekly schedule set the fan schedules to off on Saturday, Sunday and identified holidays.

In addition to automated operation of the fan device based on a pre-programmed schedule of fan device events, e.g., a weekly 7-day schedule or 365 day (366 on leap year) schedule of fan device events, in some embodiments, the fan device can also be programmed to take actions in response to the fan device receiving one or more inputs, e.g., signals from one or more sensors or devices that provide data on the current environmental conditions of the customer premises such as for example the temperature of the customer premises and/or the room in which the fan device is located, whether the air conditioning system is on or off, or whether the heating system is on or off. For example, the fan device may be, and in some embodiments does, offer two modes of automatic operation of the fan device in connection with the HVAC system on the customer premises. In the first mode of operation, the fan device turns on the fan automatically a specified time, e.g., five minutes, after the fan device receives a message or signal indicating that the heating or air conditioning system is turned off, e.g., HVAC turns off five minutes after the fan device turns the fan on to a preset speed and direction set by the user. In a second mode of operation, the fan of the fan device is turned on to a preset speed and direction automatically when the fan device receives a message or signal indicating that the heating or air conditioning system has turned on and the fan of the fan device turns the fan off automatically after a preset amount of time, e.g., five minutes, after receiving a message or a signal that the heating or air conditioning system has turned off. The use of the fan device assists the distribution of either the cold or hot air provided by the HVAC system.

In some embodiments, the fan device is set to turn on or off automatically based on the temperature in the customer premises. For example after receiving a signal or message indicating a temperature in or on the customer premises, the processor of the fan device or the control server compares the temperature to a temperature threshold value, e.g., 80 degrees Fahrenheit, and if temperature exceeds the temperature threshold value the fan device is operated to turn on the fan if it is not already on. In some additional embodiments, the speed and direction of the fan of the fan device is also automatically set when temperatures corresponding to fan speed threshold are exceeded. For example when 80 degrees Fahrenheit is exceed the fan speed is set to low, when 85 degrees Fahrenheit is exceeded the fan speed is increased, when 90 degrees Fahrenheit is exceeded the fan speed is increased again.

In some embodiments, the control server receives messages indicating the environmental conditions at the customer premises and/or the activation or deactivation of the heating or air conditioning system, compares the environmental conditions and/or state of the heating or air conditioning system, and sends one or more commands/messages to the fan device to turn on or off the fan of the fan device and set the speed and direction of the fan thereby automatically controlling the fan device in accordance with settings of the fan device inputted by a user without the fan device requiring separate sensor inputs.

In some embodiments, the fan device is configured to be updateable via over the air (OTA) updates allowing for future features and enhancements to be downloaded into the fan device from the control server or another device. Similarly the applications being executed on the wireless WiFi terminals may be updated over the air.

As previously discussed in some embodiments, multiple fan devices are grouped together allowing for the control of all of the fan devices in the group at one time. For example, a first set of fan devices at a customer premises may be placed in a first group, e.g., fan devices on the first floor of a house may be placed in a first group such as fan devices in a living room, kitchen, hall way and dining room. These fan devices may all be mated or paired to a first wall control unit so that any RF messages sent from the first wall control unit (e.g., light on/off, fan on/off, etc.) will be received an acted upon by all of the fan devices in the first group in unison. Additionally, the control server will identify all of these fan devices as being in the first group and will allow the user to control the multiple fan devices in the first group at the same time. For example, a user may input via the wireless terminal device a group instruction to turn on all of the fans of the group in which case, all of the fans of the group will be turned on at the same time or concurrently. A customer premise may include one or more groups of fan devices. For example, while a first group of fan devices allow for the control of the fan devices in the first group such as those fan devices on the first floor or a house, a second fan group can be used to control the fan devices on the second floor of the house which are included in a second fan device group. In addition to the fan devices in a group being controlled as a group, the fan devices of the group can also still be controlled as individual fan devices. For example, at a first time the fan device group lights on event command may be given and all of the lights on the fan devices in the group will have their lights turned on. At a second later time a fan device light off command may be given to turn off a particular light on one of the fan devices in the group. While the light on that particular fan will turn off the lights on the remaining fan devices of the group will remain on. If a fan device group command to turn the lights off in the group is give the light for the individual fan device that is off will remain off while the lights on the remaining fan devices in the group will turn off. In this way, fan devices can be controlled both as a group and individually.

In some embodiments, control of one or more fan devices at a customer premise may be shared with one or more users. For example, control of fan devices at a customer premise can be shared by parents and children, employees, and guests. In an exemplary embodiment a guest is given permission to control one or more fan devices in a customer premises. The owner or operator selects which fan devices the guest can control and inputs this information into the control server and/or the fan device. The owner or operator of the customer premises at which the fan devices are located then sends an invite message to a guest's mobile device. In response to the invite the guest via his or her mobile device would, after authentication such as entry of a password provided by the owner or operator of the customer premises to the guest, be allowed to login to an application running on the control server or the fan device from which the guest could operate the fan device using the guests mobile device. As previously discussed, the guest's access may be restricted to certain fan devices at the customer premises such as for example allowing the guest to control the fan device(s) in the guest bedroom and/or living room while being restricted from controlling the fan devices in other areas of the customer premises. The owner or operator of the customer premises also concurrently having the ability to control the same devices as the guest. In this way, multiple users may control the same fan devices. When the owner or operator of the customer premises decides to end the guest's access to the system and control of the fans device(s) the owner or operator of the customer premises inputs a request or command to the control server and/or fan device(s) indicating that the guest is no longer allowed to access the system and/or control the fan devices upon which the control server and/or fan device prevents the guest from accessing the system, e.g., by no longer accepting the login credentials, e.g., user id or password, of the guest.

In some embodiments, the fan devices include a sleep mode in which the user can set independent timers for when the fan of the fan device and when light of the fan device can be turned off e.g., after 45 minutes after activation of sleep mode, so that when the sleep timer for the fan expires the fan of the fan device turns off and when the sleep timer for the light of the fan device expires, the light of the fan device will automatically turn off. Additionally, a synch command activated from a menu presented to the user on the WiFi mobile device allows the independent sleep mode timer for the fan and light of the fan device to be synchronized so that if they are set to different time values they will synchronized and will both turn off at the same time. The independent sleep timers being synchronized to the shorter time period of either the fan sleep timer value or the light sleep timer value of the sleep timer values being synchronized.

List of Exemplary Numbered Method Embodiments

Method Embodiment 1. A control method comprising: receiving, at a fan device including a radio frequency signal receiver and a WiFi interface, a first radio frequency (RF) control signal from a control unit, said fan device and said control unit being located at a customer premises; implementing, at the fan device, an operation in response to a first command communicated by the first RF control signal; and operating the fan device to communicate to a server located outside the customer premises, via the WiFi interface, information indicating the operation implemented in response to the first command.

Method Embodiment 2. The method of Method Embodiment 1, wherein said fan device and said control unit are located in the same room.

Method Embodiment 3. The method of Method Embodiment 1, wherein said control unit is a wall mounted unit through which power is supplied to the fan device, said first RF control signal being a wireless signal transmitted from an RF transmitter in the control unit to an RF receiver in the fan device.

Method Embodiment 4. The method of Method Embodiment 3, wherein the control unit does not include a WiFi interface.

Method Embodiment 5. The method of Method Embodiment 1, wherein said first command is one of: a fan on command, a fan off command, a fan power state change command, a fan speed up command, a fan speed down command, a fan direction change command, a light on command, a light off command, a light power state change command, a light increase command, a light decrease command.

Method Embodiment 6. The method of Method Embodiment 1, wherein said RF control signal is sent using an RF frequency which is not used for WiFi signals.

Method Embodiment 7. The method of Method Embodiment 6, further comprising: operating a WiFi router located at the customer premises to receive a first WiFi control signal from a wireless terminal located at the customer premises, said first WiFi control signal communicating a second command used to control the fan device; operating the WiFi router to communicate, via a WiFi signal, the second command to the fan device; and operating the fan device to implement the second command.

Method Embodiment 8. The method of Method Embodiment 7, further comprising: operating the fan to communicate to the server located outside the customer premises, via the WiFi interface, information indicating the operation implemented m response to the second command.

Method Embodiment 9. The method of Method Embodiment 8, wherein the second command is communicated from the wireless terminal to the fan device via the WiFi router located in the customer premises without said second command traversing a network outside the customer premises.

Method Embodiment 10. The method of Method Embodiment 9, further comprising: operating the server to receive a third command directed to the first fan device; and operating the server to communicate the third command via the Internet and said WiFi router to the fan device.

Method Embodiment 11. The method of Method Embodiment 10, further comprising: operating the server to update information about the state of one or more devices at the first customer premises based on the third command communicated to the fan device.

Method Embodiment 12. The method of Method Embodiment 11, wherein said updating of the information about the state of one or more devices at the first customer premises is performed in response to transmitting the third command from the server.

Method Embodiment 13. The method of Method Embodiment 9, further comprising: operating the server to generate a proposed normal device control schedule for the first customer premises from stored information indicating the state of one or more devices at the first customer premises over a period of; communicate from the server the proposed device control schedule to a device corresponding to the first customer premise; receive at the server a message indicating approval of the proposed normal device control schedule for the first customer premises or a revised schedule for the first customer premises; and storing as an approved normal control schedule for the first customer premises the approved proposed normal device control schedule or the revised schedule.

Method Embodiment 14. The method of Method Embodiment 13, further comprising: operating the server to control one or more devices at the first customer premises based on the stored approved normal device control schedule, said one or more devices including the first fan device.

Method Embodiment 15. The method of Method Embodiment 14, wherein operating the server to control one or more devices at the first customer premises based on the stored approved normal device control schedule includes transmitting a control signal from the server to the first fan device via the Internet and WIFi router to control the fan device to turn on at a time indicated by said approved normal control schedule.

Method Embodiment 16. The method of Method. Embodiment 13, further comprising: operating the server to generate an away schedule to be used to control one or more device at the first customer premises when the customer indicates they are away from the customer premises.

Method Embodiment 17. The method of Method Embodiment 16, wherein operating the server to generate an away schedule includes generating said away schedule as a function of a random function used to at least partially randomize the on or off times of one or more devices.

Method Embodiment 18. The method of Method Embodiment 17, wherein operating the server to generate the away schedule includes using information about past device on and off status in combination with said random function to control the on and off times of at least one device, said on and off times deviating from historical on and off times by an amount of time which does not exceed a set maximum amount of time and which is determined by said random function.

Method Embodiment 19. The method of Method Embodiment 16, further comprising, receiving, at the server, a signal from a user indicating an away status; and switching, at the server, from using the stored approved normal schedule to using the stored away schedule to control the one or more devices at the first customer premises.

List of Exemplary Numbered System Embodiments

System Embodiment 1. A system comprising: a fan device comprising: a fan motor; a radio frequency (RF) signal receiver configured to receive radio frequency (RF) control signals from a control unit, said fan device and said control unit being located at a customer premises; a WiFi interface; a fan motor control circuit configured to control the fan motor in response to a received first radio frequency control signal, said first radio frequency control signal communicating a first command; and a first processor configured to communicate to a server, located outside the customer premises, via the WiFi interface, information indicating an operation implemented in response to the first command.

System Embodiment 2. The system of System Embodiment 1, wherein said fan device further comprises: a light; and a light control circuit configured to control the light in response to a received second radio frequency control signal, said second radio frequency control signal communicating a second command; and wherein said first processor is further configured to communicate to said server, via the WiFi interface, information indicating an operation implemented in response to said second command.

System Embodiment 3. The system of System Embodiment 2, wherein said fan device and said control unit are located in the same room.

System Embodiment 4. The system of System Embodiment 2, further comprising said control unit; wherein said control unit includes an RE transmitter; and wherein said control unit is a wall mounted unit through which power is supplied to the fan device, said first RF control signal and said second RF control signal being wireless signals transmitted from said RF transmitter in the control unit to said RF signal receiver in the fan device.

System Embodiment 5. The system of System Embodiment 4, wherein the control unit does not include a WiFi interface.

System Embodiment 6. The system of System Embodiment 2, wherein said first RF control signal communicates one of a fan on command, a fan off command, a fan power state change command, a fan speed up command, a fan speed down command, a fan direction change command; and wherein said second RF control signal communicates one of: a light on command, a light off command, a light power state change command, a light increase command, a light decrease command.

System Embodiment 7. The system of System Embodiment 2, wherein said first RF control signal and said second RF control signal are sent using RF frequencies which are not used for WiFi signals.

System Embodiment 8. The system of System Embodiment 7, further comprising: a WiFi router located at the customer premises, said WiFi router comprising: a receiver configured to receive a first WiFi control signal from a wireless terminal located at the customer premises, said first WiFi control signal communicating a third command used to control the fan device; a transmitter configured to communicate, via a WiFi signal, the third command to the fan device; and wherein said first processor is configured to control at least one of the fan motor control circuit or the light control circuit to implement the third command.

System Embodiment 9. The system of System Embodiment 8, further comprising: wherein said first processor as configured to control the WiFi interface in said fan device to send information indicating the operation implemented in response to the third command.

System Embodiment 10. The system of System. Embodiment 9, further comprising: said wireless terminal, wherein said wireless terminal includes: a WiFi interface; and a fan device control application configured to generate said third command in response to user input; and wherein the third command is communicated from the wireless terminal to the fan device via the WiFi router located in the customer premises without said third command traversing a network outside the customer premises.

System Embodiment 11. The system of System Embodiment 10, further comprising: said server, wherein said server includes a second processor configured to: operating the server to receive a fourth command directed to the first fan device; and operating the server to communicate the fourth command via the Internet and said WiFi router to the fan device.

System Embodiment 12. The system of System Embodiment 11, wherein said second processor is further configured to: operating the server to update information about the state of one or more devices at the first customer premises based on the fourth command communicated to the fan device.

System Embodiment 13. The system of System Embodiment 12, wherein said updating of the information about the state of one or more devices at the first customer premises is performed in response to transmitting the fourth command from the server.

System Embodiment 14. The system of System Embodiment 10, wherein said second processor is further configured to: operating the server to generate a proposed normal device control schedule for the first customer premises from stored information indicating the state of one or more devices at the first customer premises over a period of time operate the server to send the proposed device control schedule to a device corresponding to the first customer premise; operate the server to receive a message indicating approval of the proposed normal device control schedule for the first customer premises or a revised schedule for the first customer premises; and operate the server to store as an approved normal control schedule for the first customer premises the approved proposed normal device control schedule or the revised schedule.

System Embodiment 15. The system of System Embodiment 14, wherein said second processor is further configured to: operating the server to control one or more devices at the first customer premises based on the stored approved normal device control schedule, said one or more devices including the first fan device.

System Embodiment 16. The system of System Embodiment 15, wherein said second processor is configured to: operate the server to send a control signal from the server to the first fan device via the Internet and WIFi router to control the fan device to turn on at a time indicated by said approved normal control schedule, as part of being configured to operate the server to control one or more devices at the first customer premises based on the stored approved normal device control schedule.

System Embodiment 17. The system of System Embodiment 14, wherein said second processor is further configured to: operate the server to generate an away schedule to be used to control one or more device at the first customer premises when the customer indicates they are away from the customer premises.

System Embodiment 18. The system of System Embodiment 17, wherein said second processor is configured to: generate said away schedule as a function of a random function used to at least partially randomize the on or off times of one or more devices, as part of being configured to operate the server to generate an away schedule.

System Embodiment 19. The system of System Embodiment 18, wherein said second processor is configured to use information about past device on and off status in combination with said random function to control the on and off times of at least one device, said on and off times deviating from historical on and off times by an amount of time which does not exceed a set maximum amount of time and which is determined by, said random function, as part of being configured to operate the server to generate the away schedule.

System Embodiment 20, The system of System Embodiment 17, wherein said server further comprises: a receiver configured to receive a signal from a user indicating an away status; and wherein said second processor is further configured to control the server to switch from using the stored approved normal schedule to using the stored away schedule to control the one or more devices at the first customer premises.

List of Exemplary Numbered Apparatus Embodiments

Apparatus Embodiment 1. A fan device controller including: an AC voltage input; an AC output for supplying power to a fan device; an RF signal interface including an RF signal transmitter for transmitting commands to a device to be controlled; an RF controller for controlling the RF signal interface to send control signals including one or more commands to said fan device; and a disconnect switch for disconnecting said AC output from said AC input when said disconnect switch is switched to a disconnect state from a connect state.

Apparatus Embodiment 2. The fan device controller of Apparatus Embodiment 1, further comprising: a fan control input for turning a fan on or off; and a light control input for turning a light on or off.

Apparatus Embodiment 3. The fan device controller of Apparatus Embodiment 2, further comprising: a light up input coupled to said RF controller; and a light down input coupled to said RF controller.

Apparatus Embodiment 4. The fan device controller of Apparatus Embodiment 3, further comprising: a fan speed up input coupled to said RF controller; and a fan speed down input coupled to said RF controller.

Apparatus Embodiment 5. The fan device controller of Apparatus Embodiment 4, further comprising: a fan reverse input coupled to said RF controller.

Apparatus Embodiment 6. The fan device controller of Apparatus Embodiment 5, further comprising: a DC power supply connected to said disconnect switch and to said RF controller, said DC power supply receiving AC power from said disconnect switch and supplying DC power generated from said AC power to the RF controller.

Apparatus Embodiment 7. The fan device controller of Apparatus Embodiment 6, wherein switching the disconnect switch to a disconnect state cuts power to both the AC output and to said DC power supply thereby cutting power to a fan device coupled to said fan device controller and to the RF controller at the same time.

Apparatus Embodiment 8. The fan device controller of Apparatus Embodiment 7, wherein said RF controller includes a processor; and wherein said processor is configured to: generate commands in response to input received via one of the inputs included in said fan device controller; and control said RF interface to transmit said commands in RF signals to the fan device.

Apparatus Embodiment 9. The fan device controller of Apparatus Embodiment 8, wherein said fan device controller is configured to fit in an electrical box in a wall of a customer premises.

The techniques of various embodiments may be implemented using software, hardware and/or a combination of software and hardware. Various embodiments are directed to apparatus, e.g., fan devices, control server, WiFi router, control units, mobile devices. Various embodiments are also directed to methods, e.g., method of controlling and/or operating devices, e.g., control server device, mobile device, control units. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments elements described herein are implemented using one or more components to perform the steps corresponding to one or more methods, for example, generating, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., fan device, mobile device, WiFi device, wall unit controller, including a processor configured to implement one, multiple or all of the steps of one or more methods of the invention.

In some embodiments, the processor or processors of one or more devices, e.g., control server, fan device, mobile device, wall control unit are configured to perform the steps of the methods described as being performed by the devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., fan device, control unit device, mobile server, control server, WiFi router, with a processor which includes a component corresponding to each of the steps of the various described methods performed by the device in which the processor is included. In some but not all embodiments a device, fan device, control unit device, mobile server, control server, WiFi router, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include, different code for each step to be performed. Thus, the computer program product may, and sometimes does, include code for each individual step of a method, e.g., a method of controlling a fan device, control unit device, mobile server, control server, WiFi router. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor configured to implement some or all of the steps of the methods described herein. The processor may be for use in, e.g., a fan device, a communications device such as a WiFi mobile device, a control unit, control server or other device described in the present application.

Numerous additional variations on the systems, methods and apparatus of the various embodiments described above will be apparent to those skilled in the art in view of the above description and the claims which follow. Such variations are to be considered within the scope of the invention.

What is claimed is:

1. A fan device comprising:
a DC fan motor;
a fan motor control circuit;
a processor in electrical communication with the fan motor control circuit;
a first wireless interface configured to receive from a user controller a first signal corresponding to a first user command conforming to a first communications protocol; and
a second wireless interface configured to receive from a user controller a second signal corresponding to a second user command and configured to receive from a server a third signal corresponding to a third user command, the second signal and the third signal conforming to a second communications protocol that is different from the first communications protocol;
wherein:
the fan motor control circuit is configured to cause the fan motor to perform a first operation in response to the first signal, a second operation in response to the second signal and a third operation in response to the third signal; and
the processor is configured to transmit, via the second wireless interface, to a server, a first indication corresponding to the first operation, a second indication corresponding to the second operation and a third indication corresponding to the third operation;
further comprising:
a mounting base configured to be mounted to a ceiling; and
an AC power interface configured to provide AC filtered power to a DC power supply configured to provide DC power to the DC fan motor;
wherein:
the processor is disposed in the mounting base;
the first wireless interface is disposed in the mounting base;
the second wireless interface is disposed in the mounting base;
the AC power interface and the DC power supply are disposed in the mounting base; and
each of the AC power interface and the DC power supply are connected to a full bridge rectifier, and the full bridge rectifier is disposed in the mounting base.

2. The fan device of claim 1 wherein:
the first signal and the second signal have, respectively, a first frequency and a second frequency; and
the first frequency and the second frequency are in different frequency bands.

3. The fan device of claim 1 wherein the first wireless interface is a radio frequency (RF) interface.

4. The fan device of claim 3 wherein the second wireless interface is a WiFi interface.

5. The fan device of claim 1 further comprising a fan that has a state, and the first indication includes an indication of the state.

6. The fan device of claim 5 wherein the state is a state from the group consisting of: idle, active, fan on, fan off, fan direction, and fan speed level.

7. The fan device of claim 1 configured to be paired to a user controller;
wherein:
the fan device is a first fan device;
the user controller is configured to:
be paired to a second fan device; and
transmit a signal corresponding to a group command to the first fan device and the second fan device, wherein the first fan device and the second fan device both perform the same operation in response to the group command.

8. The fan device of claim 7 wherein the user controller is a wall control unit.

9. The fan device of claim 7 wherein the user controller is a wireless terminal.

10. The fan device of claim 9 wherein the wireless terminal is a cell phone.

11. The fan device of claim 1 wherein:
a first wall control unit corresponds to the fan device and includes:
a first AC power input; and
a first AC power output;
a second wall control unit corresponds to another fan device and includes:
a second AC power input; and
a second AC power output; and
the second AC power input is configured to source power from the first AC power output.

12. The fan device of claim 1 further comprising:
a light; and
a light control circuit configured to cause the light to perform a lighting operation in response to a lighting signal received by the first wireless interface or the second wireless interface;
wherein the processor is further configured to transmit to a server, via the second wireless interface, a fourth indication corresponding to the lighting operation.

13. The fan device of claim 12 wherein:
the light has a state;
the fourth indication includes an indication of the state; and
the state is a state from the group consisting of: light on, light off, and light intensity level.

14. The fan device of claim 1 further comprising an antenna;
wherein:
the first wireless interface is configured to transmit and receive via the antenna; and
the second wireless interface is configured to transmit and receive via the antenna.

15. The fan device of claim 1 wherein the second indication includes a device status reporting message.

16. The fan device of claim 15 wherein the device status reporting message reports a change from a previously transmitted device status reporting message.

17. The fan device of claim 16 wherein the change is in response to a control message transmitted by a wireless terminal.

18. The fan device of claim 1 wherein the processor is configured to transmit the first indication at least once in a predetermined time interval.

19. The fan device of claim 1 wherein the second wireless interface is configured to receive the third signal from a server in accordance with a schedule.

20. The fan device of claim 19 wherein the schedule is generated by a server based on a plurality of indications.

21. The fan device of claim 1 configured to receive an input from an auxiliary device configured to provide data about an environmental condition in a room in which the DC fan motor is located.

22. The fan device of claim 21 wherein:
- the auxiliary device is a sensor; and
- the condition is a temperature.

23. The fan device of claim 1 wherein the first indication includes a normal operation indicator.

* * * * *